(12) United States Patent
Yoshitoku et al.

(10) Patent No.: US 8,169,742 B2
(45) Date of Patent: May 1, 2012

(54) MAGNETIC RECORDING MEDIUM, MAGNETIC RECORDING AND REPRODUCING APPARATUS, METHOD FOR MANUFACTURING MAGNETIC RECORDING MEDIUM, AND METHOD FOR CHECKING MAGNETIC RECORDING MEDIUM

(75) Inventors: Daisuke Yoshitoku, Kawasaki (JP); Minoru Fujita, Tokyo (JP); Narutoshi Fukuzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 1155 days.

(21) Appl. No.: 12/003,917

(22) Filed: Jan. 3, 2008

(65) Prior Publication Data
US 2008/0170331 A1 Jul. 17, 2008

(30) Foreign Application Priority Data

Jan. 16, 2007 (JP) ................................. 2007-007462

(51) Int. Cl.
*G11B 5/82* (2006.01)
(52) U.S. Cl. ........................................................ 360/135
(58) Field of Classification Search .................. 360/135
See application file for complete search history.

(56) References Cited

U.S. PATENT DOCUMENTS

| 7,438,547 | B2 * | 10/2008 | Endoh et al. | 425/174.4 |
| 7,813,257 | B2 * | 10/2010 | Endoh et al. | 369/275.4 |
| 7,974,036 | B2 * | 7/2011 | Lee et al. | 360/51 |
| 2006/0007839 | A1 * | 1/2006 | Endoh et al. | 369/112.17 |
| 2006/0014053 | A1 | 1/2006 | Asakura et al. | |
| 2010/0014187 | A1 * | 1/2010 | Winarski | 360/75 |

FOREIGN PATENT DOCUMENTS

| JP | A-08-263837 | 10/1996 |
| JP | 2006-031855 | 2/2006 |

* cited by examiner

*Primary Examiner* — Allen Cao
(74) *Attorney, Agent, or Firm* — Oliff & Berridge, PLC

(57) ABSTRACT

A magnetic recording medium is provided, which has recording layers having concavo-convex patterns formed on both sides of a substrate and can easily distinguish one face from the other face. A magnetic recording and reproducing apparatus having the magnetic recording medium is also provided. The magnetic recording medium includes a substrate, a first recording layer formed in a first concavo-convex pattern on a side of a first face, and a second recording layer formed in a second concavo-convex pattern on a side of a second face. The magnetic recording medium also includes a distinction element which can distinguish the first face from the second face. At least part of the distinction element is disposed in a non-recording area adjacent to at least one of an inner part and an outer part of a recording area in a radial direction.

14 Claims, 15 Drawing Sheets

MAGNETIC RECORDING MEDIUM, MAGNETIC RECORDING AND REPRODUCING APPARATUS, METHOD FOR MANUFACTURING MAGNETIC RECORDING MEDIUM, AND METHOD FOR CHECKING MAGNETIC RECORDING MEDIUM

BACKGROUND OF THE INVENTION

1. Field of the Invention

The present invention relates to a magnetic recording medium in which recording layers are formed in a concavo-convex pattern on both sides of a substrate, a magnetic recording and reproducing apparatus provided with the same, a method for manufacturing the magnetic recording medium, and a method for checking the magnetic recording medium.

2. Description of the Related Art

Magnetic recording media such as hard disks which have recording layers on both sides of a substrate are now widely known. Such magnetic recording media are sectioned into data areas and servo areas, and the servo information for positioning a magnetic head and the like is recorded in the servo areas. The servo areas are radially positioned at appropriate intervals in a circumferential direction. The magnetic head is movable in an arc-shaped trajectory along the radial direction of the magnetic recording medium in close proximity to the surface of the magnetic recording medium, and each servo area is positioned in an arc-shape corresponding to the arc-shaped trajectory of the magnetic head. In the case of magnetic recording media having recording layers on both sides of the substrate, a magnetic head for the recording layer on one side and a magnetic head for the recording layer on the other side are arranged to move along a coaxial central axis. Accordingly, the shape of the servo areas in the recording layer on one side and the shape of the servo areas in the recording layer on the other side are plane-symmetric to each other and are therefore not the same.

The servo information refers to binary information, being "0" or "1" which is recorded on each magnetic domain corresponding to one bit of information by a predetermined servo pattern. In a conventional longitudinal recording medium, binary information of 0 or 1 is recorded by magnetizing each magnetic domain in one or the other circumferential direction. In perpendicular recording media, which have become increasingly widespread, binary information of 0 or 1 is recorded by magnetizing each magnetic domain in one or the other direction perpendicular to its surface.

In the step of recording servo information, the magnetic domains are magnetized one by one in accordance with the binary information of 0 or 1 for each magnetic recording medium. Hence, low productivity tends to be a problem. In particular, in recent years, with an increase in areal density and with a decrease in the head flying height accompanying the increase in areal density, high density and high precision recording is required even for the servo information. Therefore, there are growing demands to improve the recording efficiency of the servo information.

In view of the foregoing, a technique has been proposed in which, in a servo area, a recording layer is formed in only one of an area for recording binary information of 0 and an area for recording binary information of 1, and this recording layer is formed in the shape of a servo pattern (see, for example, Japanese Patent Application Laid-Open No. 2006-31855). In this manner, since the recording layer is magnetized so as to conform to the servo pattern by applying a direct current magnetic field uniformly to the magnetic recording medium, it is possible to substantially increase the recording efficiency of the servo information.

Meanwhile, a significant improvement in the areal density of magnetic recording media has been achieved by, for example, reducing the size of magnetic particles constituting a recording layer, changing materials, and improving the precision of head processing. A further increase in the areal density is expected in the future. However, problems such as the limit of magnetic head processing and the incorrect recording of information on a track adjacent to a target recording track due to the broadening of the recording magnetic field emanating from a magnetic head, crosstalk during reproduction have become apparent. Therefore, the improvement of the areal density by conventional improvement techniques has reached its limit.

Accordingly, as candidates for magnetic recording media in which a further improvement in the areal density can be achieved, discrete track media and patterned media have been proposed. In the discrete track media, a recording layer in a data area is formed in a concavo-convex pattern corresponding to the pattern of a track. In a patterned medium, a recording layer is formed in a concavo-convex pattern corresponding to the shape that divides a track in a circumferential direction.

When such discrete track media and patterned media are manufactured, the recording layer in a servo area can be processed into a concavo-convex pattern corresponding to a servo pattern in a process where the recording layer in the data area is processed into the concavo-convex pattern corresponding to the shape of the track or the like, and this is particularly advantageous in terms of productivity.

Using the methods of lithography and dry etching, which are used in the process of manufacturing a semiconductor, makes it possible to process the recording layer into the concavo-convex patterns that correspond to the track and the servo pattern.

However, since it appeared that one side of the magnetic recording medium had the same form as the other side thereof, this created a problem in the manufacturing process.

For example, since the manufacture of a magnetic recording medium in which the recording layer was formed in a concavo-convex pattern corresponding to the track pattern and the servo pattern, and which was not a continuous film, required high precision processing, it was preferable to control the precision of the deposition and etching of each layer forming the magnetic recording medium individually on one side and then the other side. However, it appeared as if one side of the magnetic recording medium had the same appearance as the other side, and as such, it was difficult to control the precision of the deposition and etching of each layer individually on one side and then the other side.

Moreover, since the shape of the servo area of the recording layer on one side and the shape of the servo area of the recording layer on the other side were plane-symmetric and were therefore not the same as described above, it was necessary to clearly distinguish one side of the magnetic recording medium from the other side thereof when installing the magnetic recording medium in a magnetic recording and reproducing device. However, since it appeared as if one side of the magnetic recording medium had the same appearance as the other side, this operation was not easy either.

SUMMARY OF THE INVENTION

In view of the foregoing problems, various exemplary embodiments of this invention provide a magnetic recording medium in which recording layers are formed in concavo-convex patterns on both sides of a substrate and one side and the other side can be easily distinguished from each other, a magnetic recording and reproducing apparatus provided with the magnetic recording medium, a method for manufacturing the magnetic recording medium, and a method for checking the magnetic recording medium.

Various exemplary embodiments of the invention achieve the foregoing object by a magnetic recording medium which includes a substrate, a first recording layer formed in a first concavo-convex pattern on a side of a first face, which is one side of the substrate, a second recording layer formed in a second concavo-convex pattern on a side of a second face, which is another side of the substrate opposite to the side of the first face, and a distinction element for distinguishing the first face from the second face. At least part of the distinction element is disposed in a non-recording area adjacent to at least one of an inner part and an outer part of a recording area in a radial direction.

By providing the distinction element in this manner, it is possible to surely distinguish the first face from the second face. Since at least part of the distinction element is disposed in the non-recording area adjacent to at least one of an inner part and an outer part adjacent to the recording area in the radial direction, flexibility in selecting the appearance of the distinction element is increased. Therefore, it is possible to form distinction element having an easy-to-check appearance.

It is preferable that the distinction element be disposed over the entire circumference of the medium. By disposing the distinction element over the entire circumference, it is possible to quickly and certainly check the distinction element.

It is preferable that an innermost convex portion of the first concavo-convex pattern of the first recording layer and an innermost convex portion of the second concavo-convex pattern of the second recording layer in the radial direction have a shape along a circle. The inner peripheral edges of the innermost convex portions preferably have different appearances from each other and the appearances of the inner peripheral edges of the convex portions constitute the distinction element.

When the appearances of the inner peripheral edges of the innermost convex portions of the first recording layer and the second recording layer in the radial direction are different from each other and the appearances of the inner peripheral edges of the innermost convex portions constitute the distinction element, as described above, it is possible to automatically and certainly check the distinction element composed of the appearances of the inner peripheral edges of the innermost convex portions using, for example, a checker which secures the magnetic recording medium with respect to a center hole.

Accordingly, various exemplary embodiments of this invention provide a magnetic recording medium comprising: a substrate; a first recording layer formed in a first concavo-convex pattern on a side of a first face, which is one side of the substrate; a second recording layer formed in a second concavo-convex pattern on a side of a second face, which is another side of the substrate opposite to the side of the first face; and a distinction element for distinguishing the first face from the second face, wherein at least part of the distinction element is disposed in a non-recording area adjacent to at least one of an inner part and an outer part of a recording area in a radial direction.

Moreover, various exemplary embodiments of this invention provide a method for manufacturing a magnetic recording medium, the method being carried out on a workpiece to be processed including a substrate, a first continuous recording layer formed on a first face side being one side of the substrate, and a second continuous recording layer formed on a second face side being another side of the substrate opposite to the first face side, the method comprising: a resin layer applying step for applying a first resin layer on the first continuous recording layer exclusive of a center portion in a radial direction by spin coating, and applying a second resin layer on the second continuous recording layer exclusive of a center portion in the radial direction by spin coating in such a manner that an appearance of an inner peripheral edge of the second resin layer differs from an appearance of an inner peripheral edge of the first resin layer; a resin layer processing step for processing the first resin layer into a concavo-convex pattern corresponding to a first concavo-convex pattern, and processing the second resin layer into a concavo-convex pattern corresponding to a second concavo-convex pattern; and an etching step for etching the first continuous recording layer on the basis of the first resin layer to form a first recording layer in the first concavo-convex pattern, and etching the second continuous recording layer on the basis of the second resin layer to form a second recording layer in the second concavo-convex pattern in which an appearance of an inner peripheral edge is different from an appearance of an inner peripheral edge of the first recording layer.

Furthermore, various exemplary embodiments of this invention provide a method for manufacturing a magnetic recording medium, the method being carried out on a workpiece to be processed including a substrate, a first continuous recording layer formed on a first face side being one side of the substrate, and a second continuous recording layer formed on a second face side being another side of the substrate opposite to the first face side, a first resin layer applied on the first continuous recording layer, and a second resin layer applied on the second continuous recording layer, the method comprising: a resin layer processing step for processing the first resin layer into a concavo-convex pattern corresponding to a first concavo-convex pattern, and processing the second resin layer into a concavo-convex pattern corresponding to a second concavo-convex pattern, and processing at least part of an inside part and an outside part of a recording area of the first resin layer in a radial direction into an appearance different from that of the second resin layer; and an etching step for etching the first continuous recording layer on the basis of the first resin layer to form a first recording layer in the first concavo-convex pattern, and etching the second continuous recording layer on the basis of the second resin layer to form a second recording layer in the second concavo-convex pattern in which an appearance of at least part of a non-recording area adjacent to at least one of an inner part and an outer part of the recording area in a radial direction is different from that of the first recording layer.

Various exemplary embodiments of this invention provide a method for checking a magnetic recording medium comprising the steps of: a preparing step for preparing a body to be checked having a substrate, a first recording layer formed in a first concavo-convex pattern on a side of a first face, which is one side of the substrate, a second recording layer formed in a second concavo-convex pattern on a side of a second face, which is another side of the substrate opposite to the side of the first face, and a distinction element for distinguishing the first face from the second face, at least part of the distinction element being disposed in a non-recording area adjacent to at least one of an inner part and an outer part of a recording area in a radial direction; and a distinguishing step for distinguishing the first face from the second face of the body to be checked on the basis of the distinction element.

In the present application, the phrase "a first recording layer formed in a first concavo-convex pattern" includes, in addition to a recording layer in which a continuous recording layer is divided into a number of recording elements by a predetermined pattern, a recording layer in which a recording element is partially formed in a substrate such as, for example, a recording layer in which recording elements in the shape of a track are continued to one another at their ends and a recording layer having a helical recording element, a recording layer in which concave portions are formed partially in a thickness direction and a surface on the side of the substrate is continued, a continuous recording layer formed following the surface of the substrate or an under layer having a concavo-convex pattern, and a recording layer formed separately on top faces of convex portions and bottom faces of concave portions of a substrate or an under layer having a concavo-convex pattern. The same is applied to the definition for the phrase "a second recording layer formed in a second concavo-convex pattern."

In the present application, the phrase "at least part of a distinction element is disposed in a non-recording area adjacent to at least one of an inner part and an outer part of a recording area in a radial direction" should be understood to include a case where part or the whole distinction element is disposed on the border between the non-recording area and the recording area, in addition to a case where part or the whole distinction element is disposed in the non-recording area.

In the present application, the phrase "a shape along a circle" should be understood to include the shape of a continuous circle the radius of which is fixed, the shape of a continuous ring the radius of which varies wavily in accordance with a position in a circumferential direction, the shape of an intermittent circle the radius of which is fixed, and the shape of an intermittent ring the radius of which varies wavily in accordance with a position in the circumferential direction.

In the present application, the term "magnetic recording media" is not limited to media such as hard disks, floppy (trademark) disks, and the like in which only magnetism is used for recording and reproducing information, but includes magneto-optical recording media such as MO (magneto optical) disks in which both magnetism and light are used and heat-assisted recording media in which both magnetism and heat are used.

DETAILED DESCRIPTION OF THE PREFERRED EMBODIMENTS

Preferable exemplary embodiments of the present invention will be hereinafter described in detail with reference to the drawings.

Figure 1:
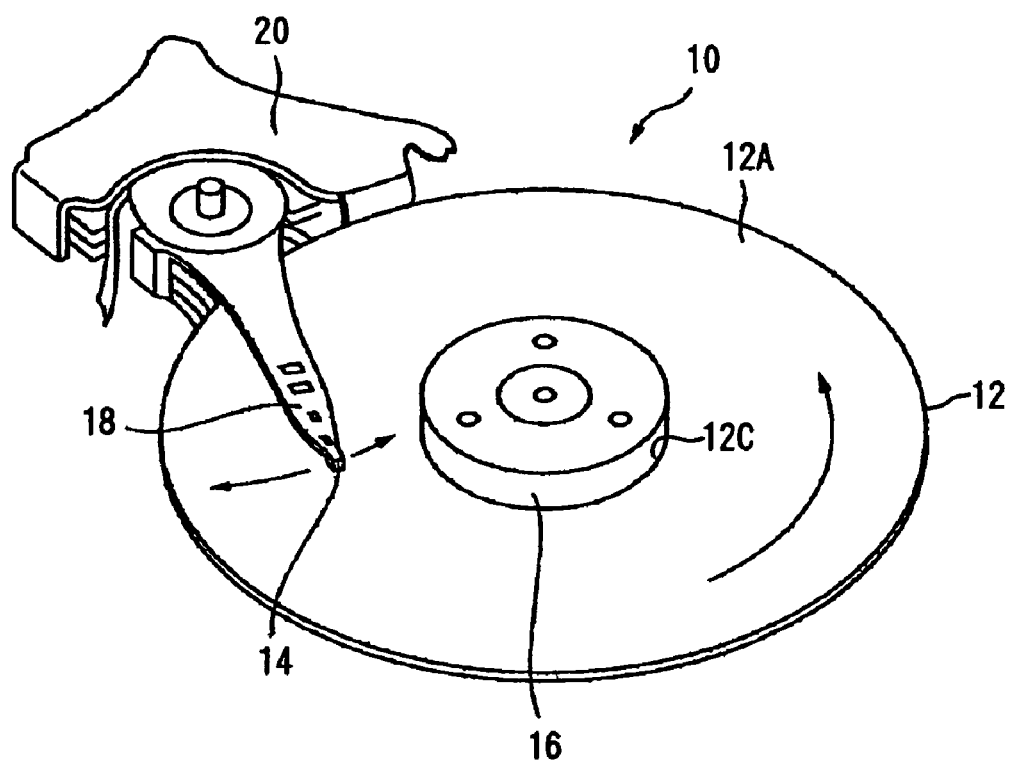
FIG. 1 is a schematic perspective view showing the general structure of main components of a magnetic recording and reproducing apparatus according to a first exemplary embodiment of the present invention.
Figure 2:
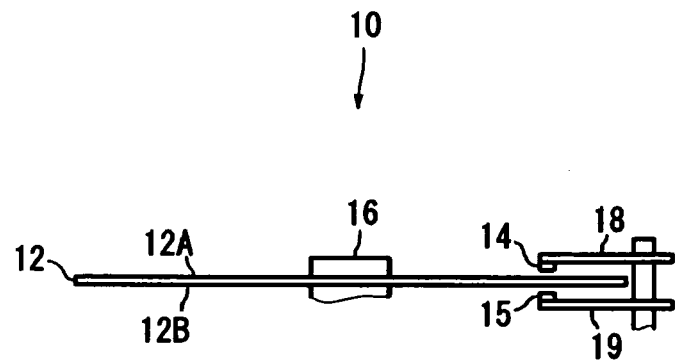
FIG. 2 is a side view of the same structure.

With reference to FIGS. 1 and 2, a magnetic recording and reproducing apparatus 10 according to a first exemplary embodiment of the present invention includes a magnetic recording medium 12, a first magnetic head 14 disposed on the side of a first face 12A of the magnetic recording medium 12, and a second magnetic head 15 disposed on the side of a second face 12B of the magnetic recording medium 12 to record/reproduce data on/from the magnetic recording medium 12. The apparatus 10 is characterized by the structure of the magnetic recording medium 12. Since the other structure does not seem to be particularly important to understand the first exemplary embodiment, the description thereof will be appropriately omitted.

The magnetic recording medium 12 having a center hole 12C is fixed with the use of a chuck 16 at the center hole 12C thereof so as to be rotatable together with the chuck 16. The first magnetic head 14 is attached to the vicinity of an end of a first arm 18 and the second magnetic head 15 is attached to the vicinity of an end of a second arm 19. The first arm 18 and the second arm 19 are attached to a base 20 so as to be coaxially rotatable around a central axis. Thus, the first magnetic head 14 and the second magnetic head 15 are movable on a coaxial arc-shaped trajectory along the radial direction of the magnetic recording medium 12 with the heads flying in the vicinity of the surfaces of the magnetic recording medium 12.

Figure 3:
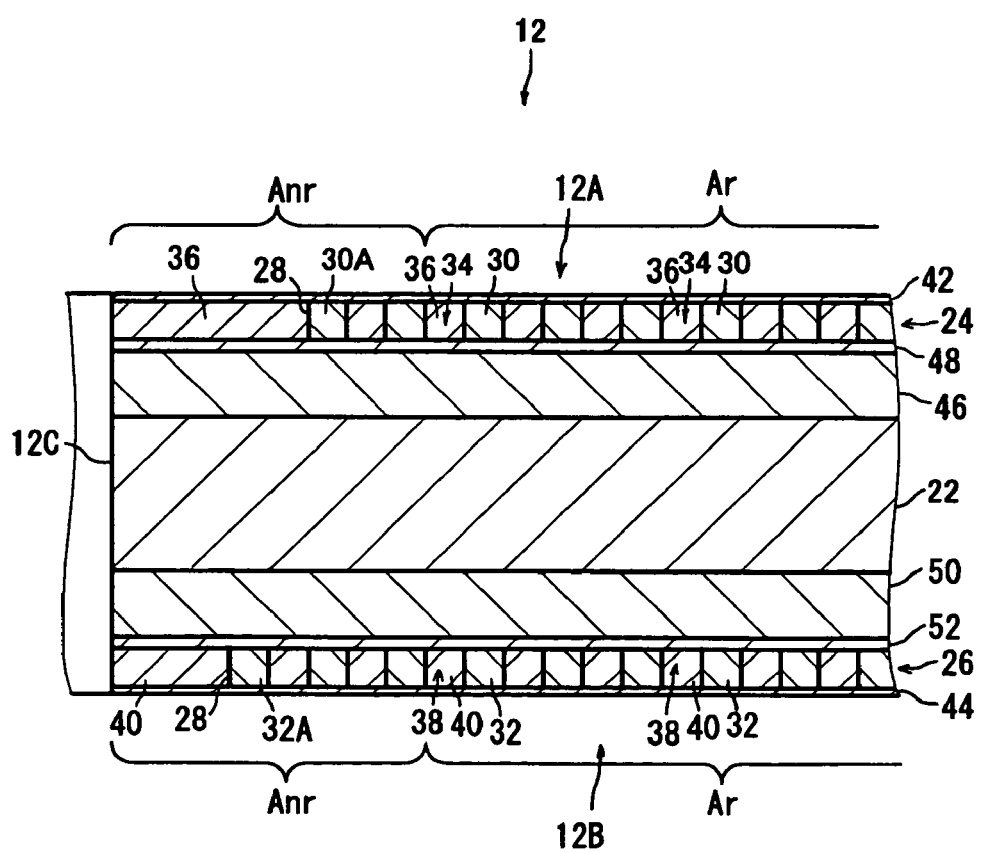
FIG. 3 is a cross-sectional view in a radial direction which schematically shows the structure of a magnetic recording medium which is to be installed in the magnetic recording and reproducing apparatus.

The magnetic recording medium 12 is a disk-shaped discrete track medium of a perpendicular recording type. As shown in FIG. 3, the magnetic recording medium 12 includes a substrate 22, a first recording layer 24 which is formed in a first concavo-convex pattern on a side of the first face 12A, which is one side of the substrate 22, and a second recording layer 26 which is formed in a second concavo-convex pattern on a side of the second face 12B, which is the other side of the substrate opposite to the side of the first face 12A. The magnetic recording medium 12 further includes a distinction element 28 for distinguishing the first face 12A from the second face 12B, and the distinction element 28 is disposed in a non-recording area Anr adjacent to an inner part of a recording area Ar in the radial direction. The distinction element 28 is disposed over the entire circumference of the magnetic recording medium 12. Note that a non-recording area Anr is also provided in an outside area adjacent to the recording area Ar in the radial direction.

Both faces of the substrate 22 are polished to mirror planes. As a material for the substrate 22, a non-magnetic material such as glass, an Al alloy coated with NiP, Si, and $Al_2O_3$ are available.

The first recording layer 24 and the second recording layer 26 each have a thickness of 5 to 30 nm. As materials of the first recording layer 24 and the second recording layer 26, a CoCr-based alloy such as a CoCrPt alloy, a FePt-based alloy, a stacked body thereof, a material in which ferromagnetic particles, such as CoPt particles, are contained in an oxide material such as $SiO_2$ in a matrix form are available.

Figure 4A:
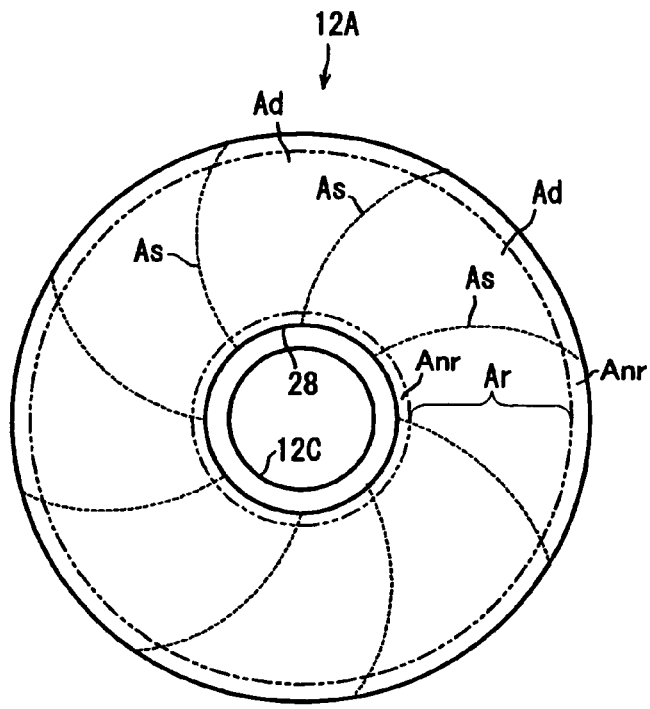
FIG. 4A is a plan view schematically showing the structure of a first face of the magnetic recording medium.
Figure 4B:
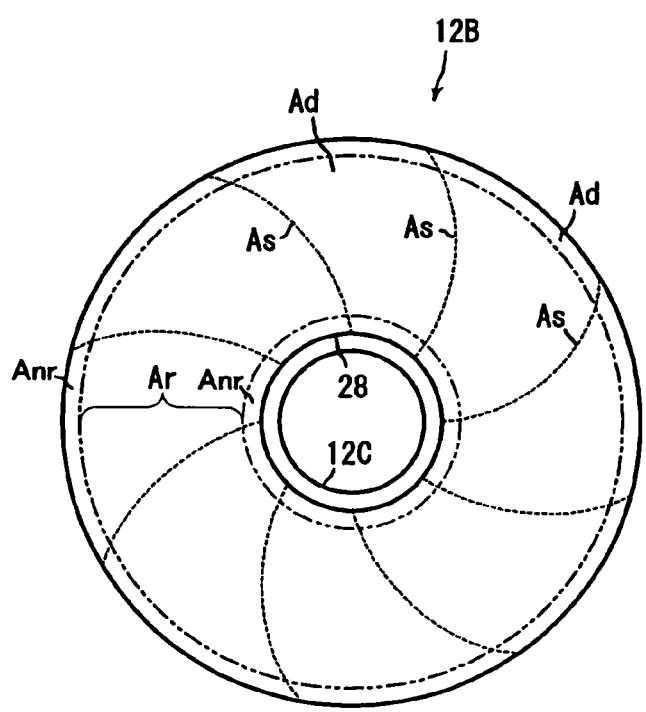
FIG. 4B is a plan view schematically showing the structure of a second face of the magnetic recording medium.

The first recording layer 24 and the second recording layer 26 are formed in data areas Ad in the recording areas Ar at small intervals in the radial direction in the shape of concentric tracks, and FIG. 3 illustrates the configuration thereof. The first recording layer 24 and the second recording layer 26 are formed in predetermined servo patterns in servo areas As in the recording areas Ar (not shown). As shown in FIGS. 4A and 4B, the servo areas As in the first face 12A and the servo areas As in the second face 12B have the shape of arcs each corresponding to arc-shaped trajectory of the first magnetic head 14 and the second magnetic head 15. The shape of the servo areas As in the first face 12A and the shape of the servo areas As in the second face 12B are plane-symmetrical to each other.

Among convex portions 30 of the first recording layer 24, an innermost convex portion 30A in the radial direction has a shape along a circle concentric with the center hole 12C. Among convex portions 32 of the second concavo-convex pattern of the second recording layer 26, an innermost convex portion 32A in the radial direction also has a shape along a circle concentric with the center hole 12C. The appearances of the inner peripheral edges of the innermost convex portions 30A and 32A in the radial direction of the first recording layer 24 and the second recording layer 26 are different from each other, and the appearances of the inner peripheral edges of the convex portions 30A and 32A constitute the distinction element 28.

To be more specific, in the first exemplary embodiment, the radius of the inner peripheral edge of the innermost convex portion 30A of the first recording layer 24 in the radial direction is different from that of the inner peripheral edge of the innermost convex portion 32A of the second recording layer 26 in the radial direction. It is preferable that the difference between the radii of the inner peripheral edges of the convex portions 30A and 32A be 100 μm to several mm.

The inner peripheral edges of the innermost convex portions 30A and 32A of the first recording layer 24 and the second recording layer 26 in the radial direction are disposed in the non-recording areas Anr each of which is adjacent to the inner part of the recording area Ar in the radial direction. FIGS. 4A and 4B schematically show the positions of the inner peripheral edges of the innermost convex portions 30A and 32A of the first recording layer 24 and the second recording layer 26 in the radial direction, the servo areas As, and the data areas Ad with respect to the recording areas Ar.

The magnetic recording medium 12 further includes a first filler 36 filling concave portions 34 of the first concavo-convex pattern of the first recording layer 24, a second filler 40 filling concave portions 38 of the second concavo-convex pattern of the second recording layer 26, a first protection layer 42 covering the first recording layer 24 and the first filler 36, and a second protection layer 44 covering the second recording layer 26 and the second filler 40.

The first filler 36 is formed also on the inside of the innermost convex portion 30A of the first recording layer 24 in the radial direction, and the second filler 40 is formed also on the inside of the innermost convex portion 32A of the second recording layer 26 in the radial direction.

As materials for the first filler 36 and the second filler 40, oxides such as silicon oxide having $SiO_2$ as a main ingredient, $Al_2O_3$, $TiO_2$, and ferrite, nitride such as AlN, carbide such as SiC, a non-magnetic metal such as Cu and Cr, a resin material, and the like are available.

The first protection layer 42 and the second protection layer 44 each have a thickness of 1 to 5 nm. As materials for the first protection layer 42 and the second protection layer 44, for example, hard carbon film which is called as diamond-like carbon and the like is available. Not-illustrated lubricating layers are applied on the first protection layer 42 and the second protection layer 44. The thickness of the lubricating layer is 1 to 2 nm. PFPE (perfluoro-polyether) and the like are available as a material for the lubricating layer.

A first soft magnetic layer 46 and a first seed layer 48 to impart magnetic anisotropy in a thickness direction (direction perpendicular to the surface) to the first recording layer 24 are formed between the substrate 22 and the first recording layer 24. A second soft magnetic layer 50 and a second seed layer 52 to impart magnetic anisotropy in the thickness direction to the second recording layer 26 are formed also between the substrate 22 and the second recording layer 26.

The first soft magnetic layer 46 and the second soft magnetic layer 50 each have a thickness of 50 to 300 nm. As materials for the first soft magnetic layer 46 and the second soft magnetic layer 50, an Fe alloy, a Co amorphous alloy, ferrite, and the like are available. The first soft magnetic layer 46 and the second soft magnetic layer 50 each may have such structure obtained by stacking a soft magnetic layer and a non-magnetic layer.

The first seed layer 48 and the second seed layer 52 each have thickness of 2 to 40 nm. As materials for the first seed layer 48 and the second seed layer 52, anon-magnetic CoCr alloy, Ti, Ru, a lamination of Ru and Ta, MgO, and the like are available.

Next, the function of the magnetic recording medium 12 will be described.

Since the magnetic recording medium 12 has the distinction element 28 which is constituted of the inner peripheral edges of the innermost convex portions 30A and 32A of the first recording layer 24 and the second recording layer 26 in the radial direction, it is possible to easily distinguish the first face 12A from the second face 12B.

To be more specific, the convex portions 30 of the first recording layer 24 and the first filler 36 are disposed in a mixed manner at intervals of several tens of nm in an area outside the inner peripheral edge, which constitutes the distinction element 28, of the innermost convex portion 30A of the first recording layer 24 in the radial direction. The convex portions 32 of the second recording layer 26 and the second filler 40 are disposed in a mixed manner at intervals of several tens of nm in an area outside the inner peripheral edge, which constitutes the distinction element 28, of the innermost convex portion 32A of the second recording layer 26. On the other hand, only the first filler 36 is located in an area inside the inner peripheral edge of the innermost convex portion 30A and only the second filler 40 is located in an area inside the inner peripheral edge of the innermost convex portion 32A, so that the areas inside the inner peripheral edges of the convex portion 30A or 32A are different from the areas outside the inner peripheral edges in color, reflectivity, and the like. Accordingly, as shown in FIGS. 4A and 4B, it is possible to optically check the inner peripheral edges of the innermost convex portions 30A and 32A, being the border between these areas, and also check the difference in the radius between the inner peripheral edges.

Since the distinction element 28 is disposed over the entire circumference, it is possible to quickly and certainly check the distinction element 28.

Figure 5:
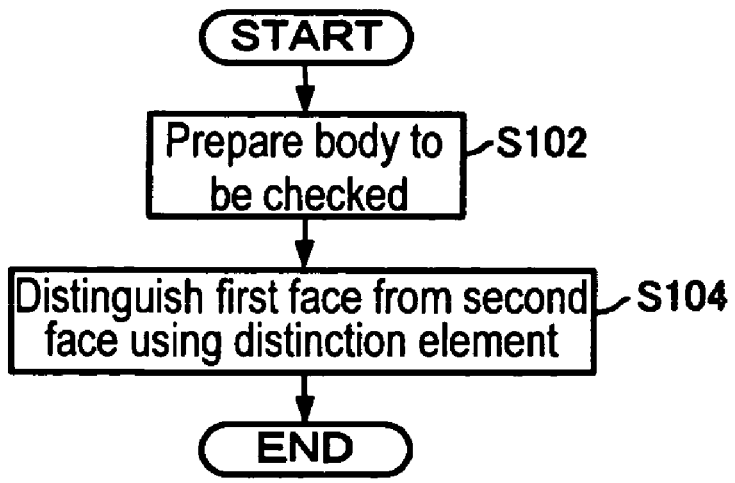
FIG. 5 is a flowchart showing an overview of a check process of the magnetic recording medium.

For example, in a case where there is a problem in the deposition accuracy, etching accuracy, or the like for each layer of the magnetic recording medium 12, as shown in a flowchart of FIG. 5, the magnetic recording medium (checked body) 12 having the distinction element 28 is prepared (S102) and the first face 12A is distinguished from the second face 12B on the basis of the distinction element 28 (S104). Thus, it is possible to confirm the deposition accuracy and the etching accuracy of each layer on the first face 12A and on the second face 12B of the magnetic recording medium 12 individually.

Since the shape of the servo areas As on the first face 12A of the magnetic recording medium 12 and the shape of the servo areas As on the second face 12B are not the same and plane-symmetric to each other, it is necessary to certainly distinguish the first face 12A of the magnetic recording medium 12 from the second face 12B thereof when installing the magnetic recording medium 12 in the magnetic recording and reproducing apparatus 10. The first face 12A is distinguished from the second face 12B on the basis of the distinction element 28, and therefore this operation is simple.

Figure 6:
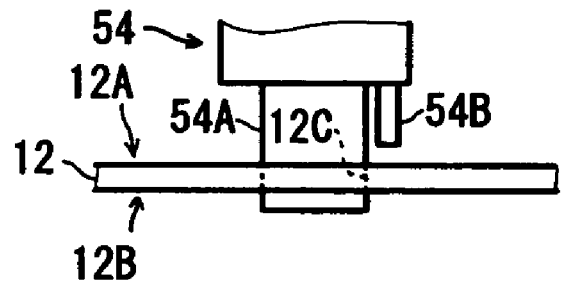
FIG. 6 is a side view schematically showing the structure of an automatic check device for checking a distinction element of the magnetic recording medium.

An operator may visually check the distinction element 28 or a check device may check it automatically. Since the distinction element 28 is constituted of the inner peripheral edges of the innermost convex portions 30A and 32A of the first recording layer 24 and the second recording layer 26 in the radial direction, by using, for example, a check device 54 which holds the magnetic recording medium 12 with respect to the center hole 12C, as shown in FIG. 6, this makes it possible to automatically and certainly detect the distinction element 28 (the appearances of the inner peripheral edges of the innermost convex portions 30A and 32A). The check device 54 includes a holder 54A for holding the magnetic recording medium 12 by the center hole 12C and a detector 54B for detecting the positions of the inner peripheral edges of the innermost convex portions 30A and 32A. The detector 54B may distinguish the radii of the inner peripheral edges of the convex portions 30A and 32A on the basis of, for example, a difference in color or reflectivity between the inside area and the outside area of each inner peripheral edge in the radial direction.

Figure 7:
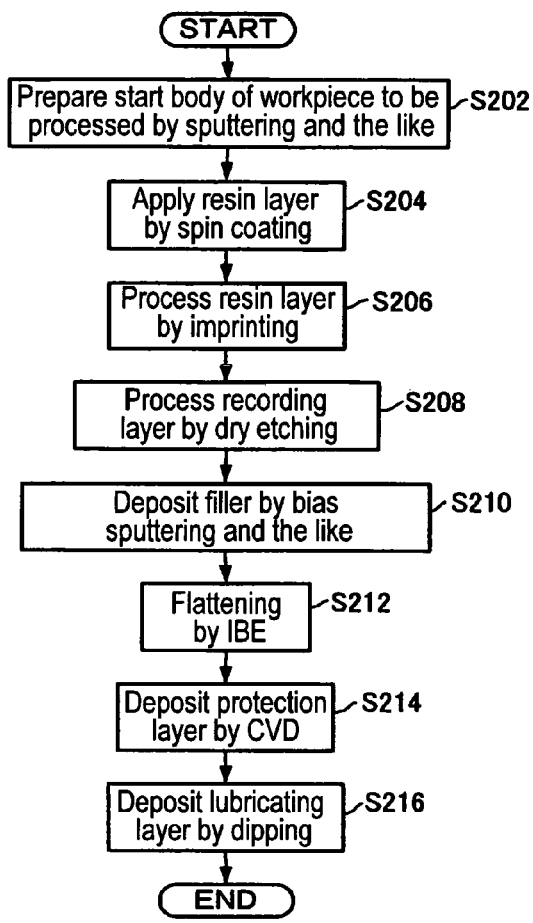
FIG. 7 is a flowchart showing an overview of a manufacturing process of the magnetic recording medium.

Next, a method for manufacturing the magnetic recording medium 12 will be described with reference to the flowchart shown in FIG. 7.

Figure 8:
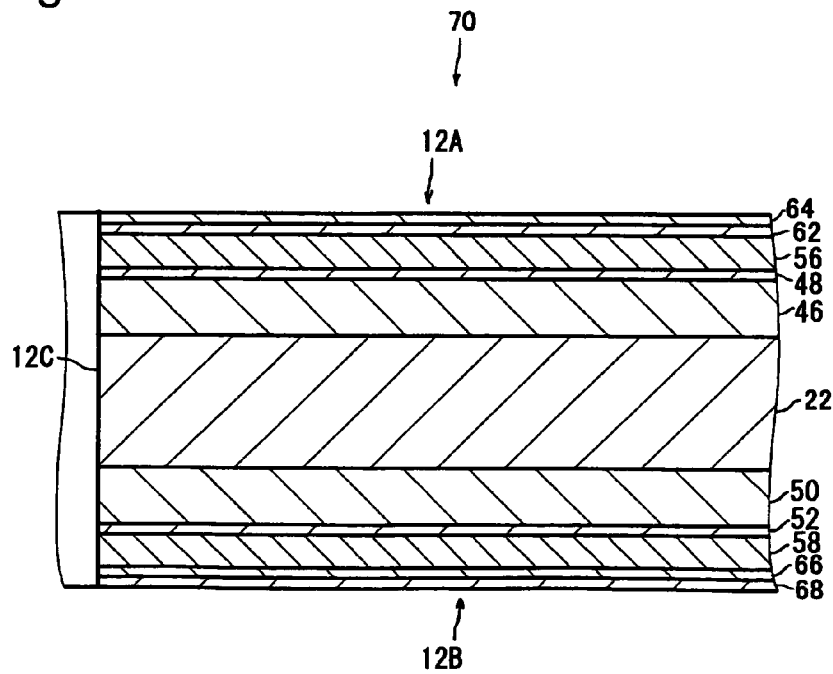
FIG. 8 is a cross-sectional view in a radial direction which schematically shows the structure of a start body of a workpiece to be processed in the manufacturing process of the magnetic recording medium.

First, as shown in FIG. 8, a start body of a workpiece to be processed 70 is prepared, which includes: the substrate 22; the first soft magnetic layer 46, the first seed layer 48, a first continuous recording layer 56, a first main mask layer 62, and a first sub mask layer 64 which are formed on the first face 12A side of the substrate 22; and the second soft magnetic layer 50, the second seed layer 52, a second continuous recording layer 58, a second main mask layer 66, and a second sub mask layer 68 which are formed in the second face 12B side of the substrate 22 (S202). The start body of the workpiece to be processed 70 is manufactured by depositing each layer over the substrate 22 by plating, sputtering, and the like. As materials for the first main mask layer 62 and the second main mask layer 66, C (carbon) and the like are available. As materials for the first sub mask layer 64 and the second sub mask layer 68, Ni and the like are available.

Figure 9A:
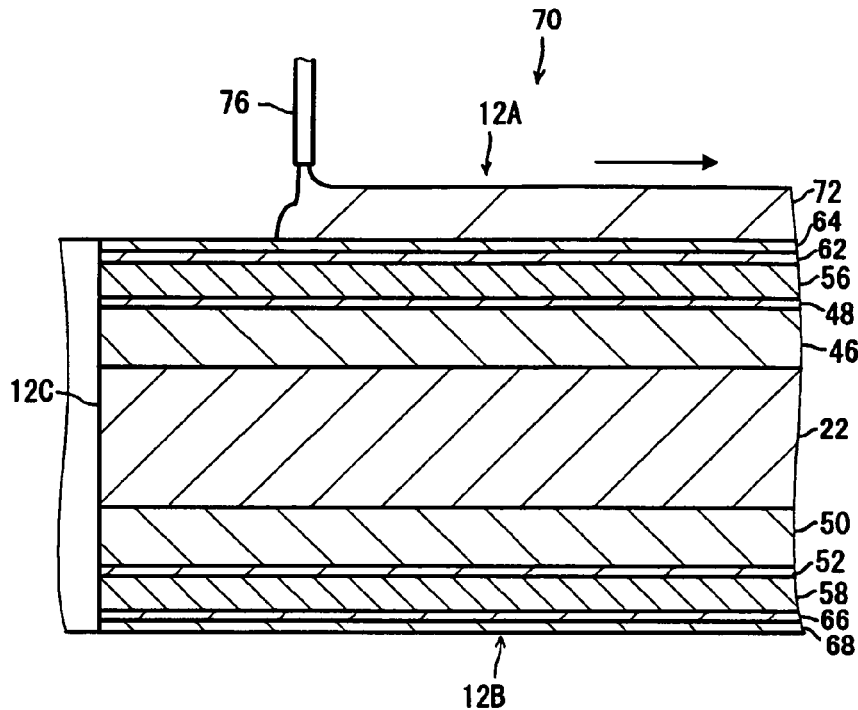
FIG. 9A is a cross-sectional view in the radial direction which schematically shows the step of applying a resin layer on the first face of the workpiece to be processed.
Figure 9B:
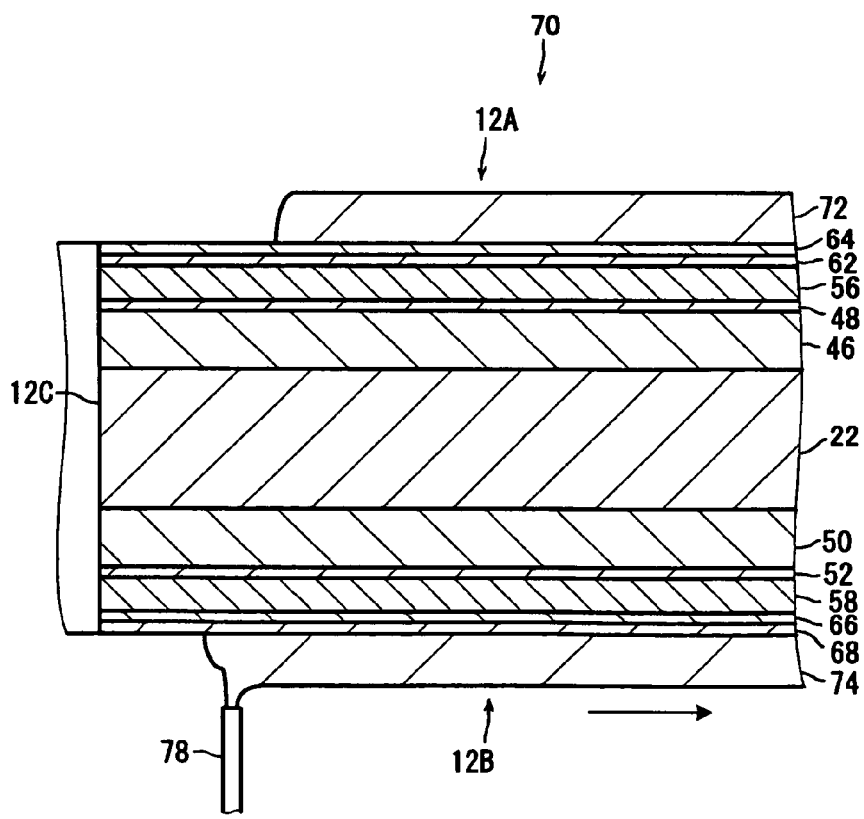
FIG. 9B is a cross-sectional view in the radial direction which schematically shows the step of applying a resin layer on the second face of the workpiece to be processed.

Next, as shown in FIG. 9A, a first resin layer 72 is applied in a toroidal configuration on the first sub mask layer 64 (over the first continuous recording layer 56) by spin coating except for a center portion in the radial direction, and also, as shown in FIG. 9B, a second resin layer 74 is applied in a toroidal configuration on the second sub mask layer 68 (over the second continuous recording layer 58) by spin coating except for a center portion in the radial direction in such a manner that the appearance of the inner peripheral edge thereof differs from that of the inner peripheral edge of the first resin layer 72 (S204). As materials for the first resin layer 72 and the second resin layer 74, for example, an acryl or epoxy energy-curable resin which is cured by the irradiation of energy rays such as ultraviolet rays is available.

To be more specific, a first nozzle 76 for applying the first resin layer 72 on the first sub mask layer 64 (over the first continuous recording layer 56) and a second nozzle 78 for applying the second resin layer 74 on the second sub mask layer 68 (over the second continuous recording layer 58) are disposed in such a manner that the radial position of the first nozzle 76 differs from the radial position of the second nozzle 78, and the first resin layer 72 and the second resin layer 74 are applied with the workpiece to be processed 70 rotating in such a manner that the radius of the inner peripheral edge of the first resin layer 72 differs from the radius of the inner peripheral edge of the second resin layer 74.

Figure 10:
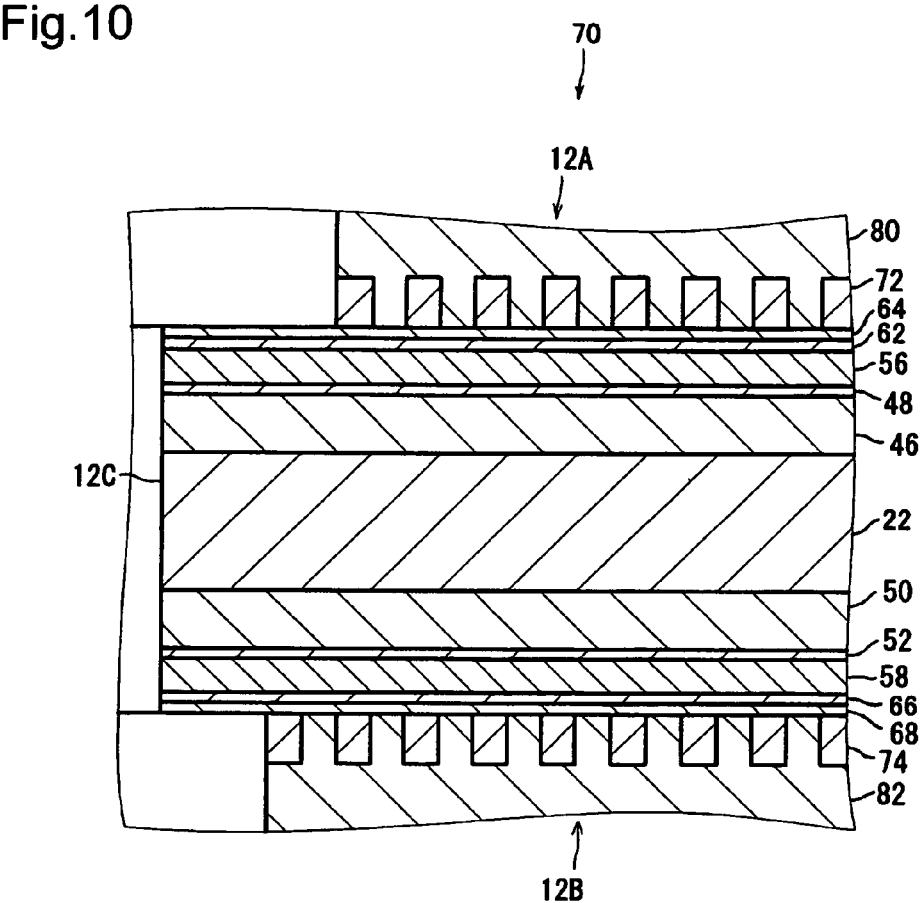
FIG. 10 is a cross-sectional view in the radial direction which schematically shows the step of processing the resin layer of the workpiece to be processed into a concavo-convex pattern.

Next, as shown in FIG. 10, a concavo-convex pattern corresponding to a first concavo-convex pattern is transferred to the first resin layer 72, using imprinting, by pressing a first stamper 80, and a concavo-convex pattern corresponding to a second concavo-convex pattern is transferred to the second resin layer 74 by pressing a second stamper 82 (S206). The first stamper 80 and the second stamper 82 are transparent or translucent. By irradiating the first resin layer 72 and the second resin layer 74 with energy rays such as ultraviolet rays through the first stamper 80 and the second stamper 82, the first resin layer 72 and the second resin layer 74 are cured, and then the first stamper 80 and the second stamper 82 are stripped away from the first resin layer 72 and the second resin layer 74, respectively. Then, any resin remaining in the bottom of any of the concave portions is removed by, for example, RIE (reactive ion etching) using an oxygen gas.

Figure 11:
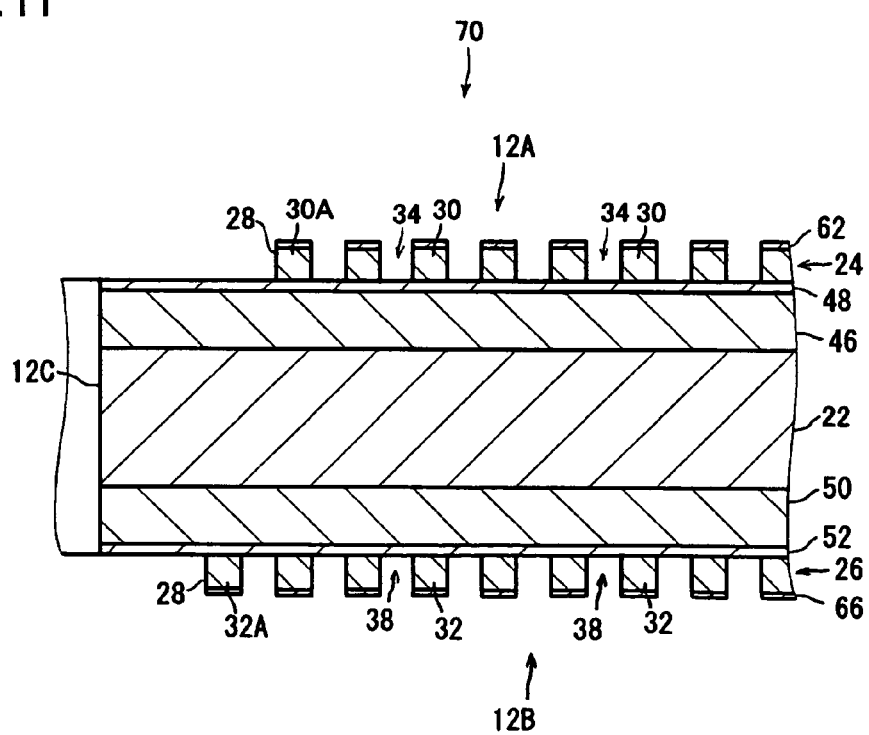
FIG. 11 is a cross-sectional view in the radial direction which schematically shows the step of processing a continuous recording layer into a concavo-convex pattern on the basis of the resin layer.

Following that, the first sub mask layer 64 and the second sub mask layer 68 in the bottoms of the concave portions are removed by, for example, dry etching such as IBE (ion beam etching) using an argon gas, and then the first main mask layer 62 and the second main mask layer 66 in the bottoms of the concave portions are removed by, for example, RIE using a $SF_6$ gas. Furthermore, as shown in FIG. 11, the first continuous recording layer 56 in the bottoms of the concave portions and the second continuous recording layer 58 in the bottoms of the concave portions are removed by, for example, IBE using an argon gas or the like (S208). Thus, the first recording layer 24 having the first concavo-convex pattern and the second recording layer 26 having the second concavo-convex pattern are formed. The first recording layer 24 and the second recording layer 26 are processed into shapes in which the radii of the inner peripheral edges of the innermost convex portions 30A and 32A in the radial direction are different from each other. The first main mask layer 62 remaining on the first recording layer 24 and the second main mask layer 66 remaining on the second recording layer 26 are removed by RIE using a $SF_6$ gas or the like.

Figure 12:
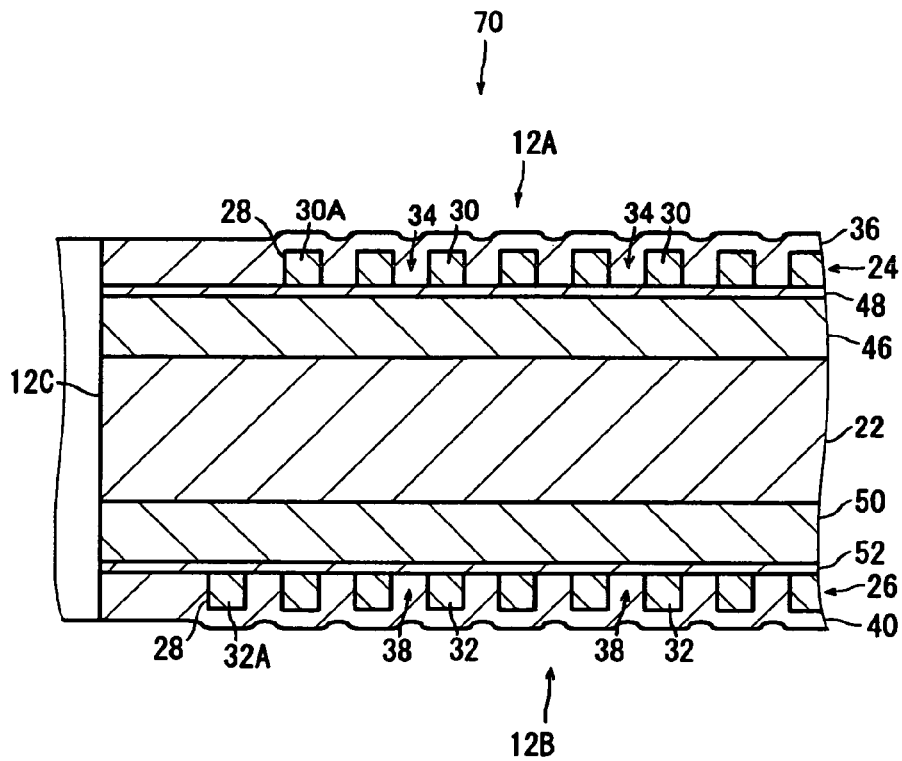
FIG. 12 is a cross-sectional view in the radial direction showing the workpiece to be processed in which a filler is deposited over the recording layer formed in the concavo-convex pattern.

Then, as shown in FIG. 12, the first filler 36 is deposited over the first recording layer 24 to fill the concave portions 34 of the first recording layer 24 with the first filler 36, and the second filler 40 is deposited over the second recording layer 26 to fill the concave portions 38 of the second recording layer 26 with the second filler 40 (S210) by bias sputtering or the like. The first filler 36 is formed also inside the innermost convex portion 30A of the first recording layer 24 in the radial direction, and the second filler 40 is formed also inside the innermost convex portion 32A of the second recording layer 26 in the radial direction. When a resin material is used as materials for the first filler 36 and the second filler 40, the first filler 36 and the second filler 40 may be deposited by spin coating.

Figure 13:
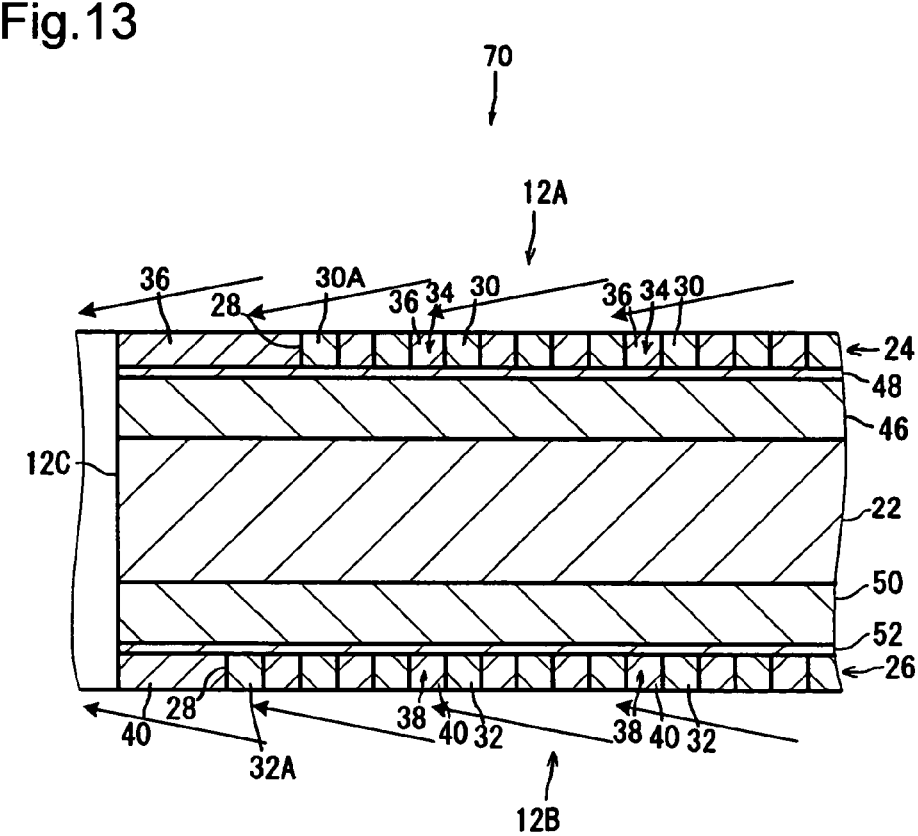
FIG. 13 is a cross-sectional view in the radial direction showing the workpiece to be processed in which the excess filler is removed in a flattening step.

Then, as shown in FIG. 13, excess parts of the first filler 36 and second filler 40 above the first recording layer 24 and the second recording layer 26 are removed to flatten the surfaces by IBE using a noble gas such as argon while rotating the workpiece to be processed 70 (S212). The arrows of FIG. 13 schematically show the direction of irradiation of the processing gas.

Next, the first protection layer 42 is deposited on the first recording layer 24 and the first filler 36, and the second protection layer 44 is deposited on the second recording layer 26 and the second filler 40 by CVD (S214). At this time, it is preferable that the workpiece to be processed 70 be held at the center hole 12C with a jig or the like. There is a case where the first protection layer 42 and the second protection layer 44 are not deposited or where the thicknesses of the first protection layer 42 and the second protection layer 44 become thinner than those of the other portions in a portion of the workpiece to be processed 70 by which the workpiece to be processed 70 is held with the jig or the like. However, since the first filler 36 is formed also inside the innermost convex portion 32A of the first recording layer 24 in the radial direction and the second filler 40 is formed also inside of the innermost convex portion 32A of the second recording layer 26 in the radial direction, even if there are portions where the first protection layer 42 and the second protection layer 44 are not deposited or where the thicknesses of the first protection layer 42 and the second protection layer 44 become thinner than the other portions, these portions are not in fact the first recording layer 24 and the second recording layer 26 but are instead parts of the first filler 36 and the second filler 40. Accordingly, the first recording layer 24 is certainly protected by the first protection layer 42, and the second recording layer 26 is certainly protected by the second protection layer 44.

Next, the lubricating layers are applied on the first protection layer 42 and the second protection layer 44 by dipping (S216). Thus, the magnetic recording medium 12 is completed.

Next, a second exemplary embodiment of the present invention will be described.

Figure 14A:
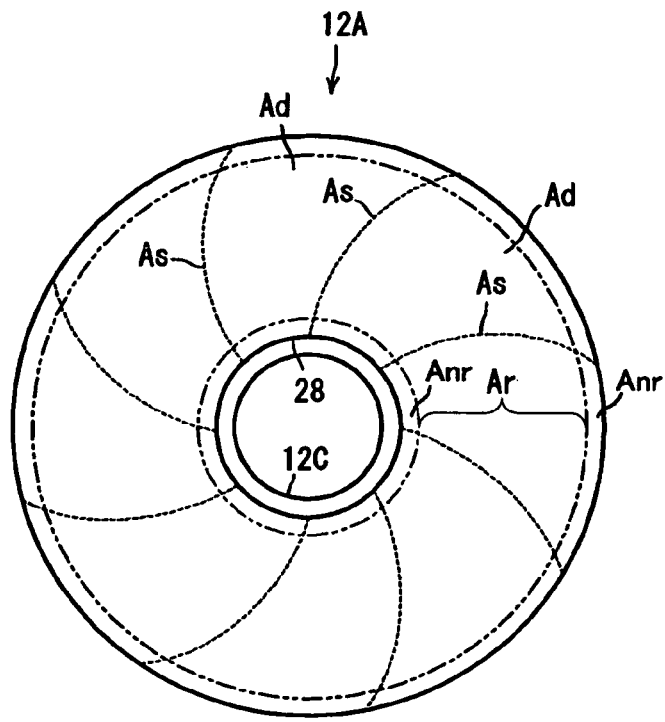
FIG. 14A is a plan view schematically showing the structure of a first face of a magnetic recording medium according to a second exemplary embodiment of the present invention.
Figure 14B:
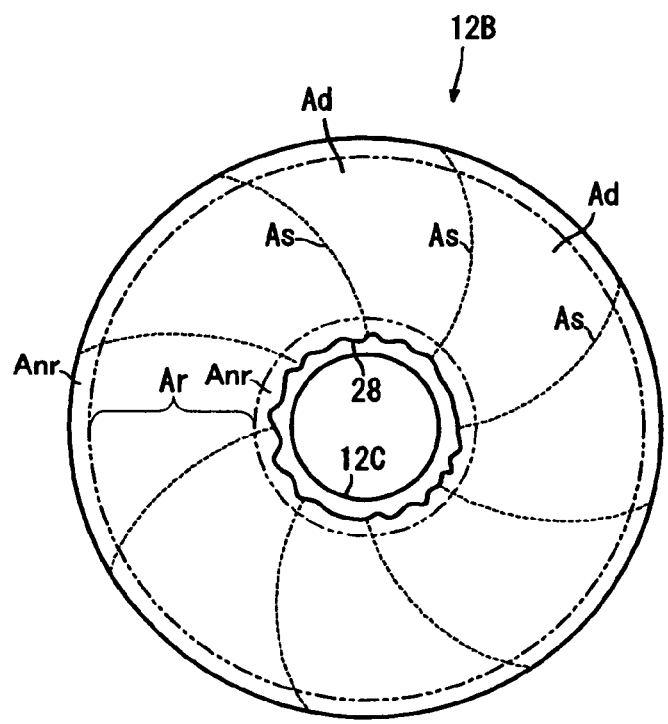
FIG. 14B is a plan view schematically showing the structure of a second face of the magnetic recording medium.

In the first exemplary embodiment, the radii of the inner peripheral edges of the innermost convex portions 30A and 32A of the first recording layer 24 and the second recording layer 26 in the radial direction are different from each other. In the second exemplary embodiment, however, as shown in FIGS. 14A and 14B, the shapes of the inner peripheral edges of the innermost convex portions 30A and 32A of the first recording layer 24 and the second recording layer 26 in the radial direction differ from each other. Accordingly, the inner peripheral edges of the innermost convex portions 30A and 32A of the first recording layer 24 and the second recording layer 26 in the radial direction, the shapes of which are different from each other, constitute the distinction element 28.

To be more specific, the inner peripheral edge of the innermost convex portion 30A of the first recording layer 24 in the radial direction has such a shape that its radius is substantially constant, whereas the inner peripheral edge of the innermost convex portion 32A of the second recording layer 26 in the radial direction has such a form that its radius varies wavily in accordance with a position in a circumferential direction. Since other components are the same as those of the first exemplary embodiment, so that the same reference numerals as in FIG. 1 to 4 are used, and the description thereof will be omitted.

Accordingly, it is possible to easily distinguish the first face 12A from the second face 12B in a case where the distinction element 28 is constituted of the inner peripheral edges of the innermost convex portions 30A and 32A of the first recording layer 24 and the second recording layer 26 in the radial direction, each having a different shape.

Since the distinction element 28 is disposed over the entire circumference, the distinction element 28 is quickly and certainly checked.

Next, a method for forming the inner peripheral edge of the innermost convex portion 32A of the second recording layer 26 in the radial direction into the shape of which radius varies wavily in accordance with the position in the circumferential direction. This method is different from that of the first exemplary embodiment only in a resin layer applying step (S204) and the other steps are the same as those of the first exemplary embodiment so that the description of the other steps will be appropriately omitted.

Figure 15:
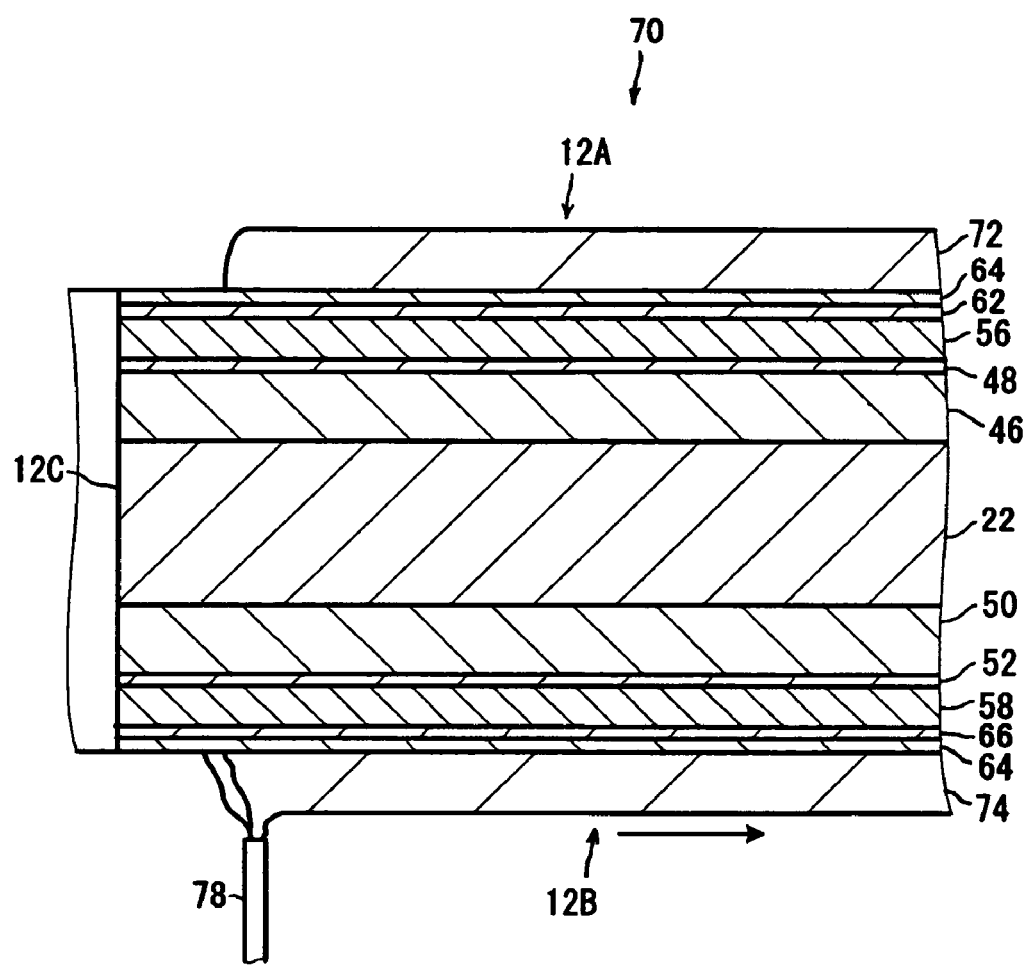
FIG. 15 is a cross-sectional view in a radial direction which schematically shows the step of applying a resin layer on the second face of a workpiece to be processed in a manufacturing process of the magnetic recording medium.

In the second exemplary embodiment, the amount of resin discharged from the first nozzle 76 for applying the first resin layer 72 in the resin layer applying step (S204) is approximately held at constant. On the other hand, as shown in FIG. 15, the amount of resin discharged from the second nozzle 78 for applying the second resin layer 74 is varied in such a manner that the radius of the inner periphery of the second resin layer 74 varies wavily in accordance with the position in the circumferential direction. In the present application, the phrase "the amount of resin discharged" means the amount of resin discharged from a nozzle per unit of time. By etching the second recording layer 26 on the basis of the second resin layer 74, it is possible to form the inner periphery of the innermost convex portion 32A of the second recording layer 26 in the radial direction into the shape of a ring the radius of which varies wavily in accordance with a position in the circumferential direction.

Next, a third exemplary embodiment of the present invention will be described.

Figure 16A:
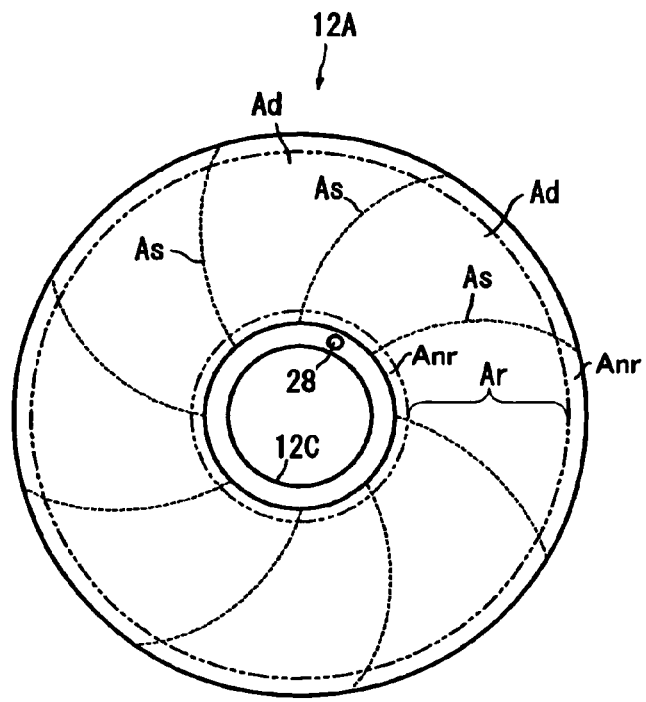
FIG. 16A is a plan view schematically showing the structure of a first face of a magnetic recording medium according to a third exemplary embodiment of the present invention.

In the first exemplary embodiment, the radii of the inner peripheral edges of the innermost convex portions 30A and 32A of the first recording layer 24 and the second recording layer 26 in the radial direction are different from each other, and the distinction element 28 is constituted of the inner peripheral edges of the innermost convex portions 30A and 32A of the first recording layer 24 and the second recording layer 26 in the radial direction which have different radii. In the third exemplary embodiment, however, as shown in FIG. 16A, the first recording layer 24 is provided with a convex portion further inside of the innermost convex portion 30A according to the first exemplary embodiment of the first recording layer 24 in the radial direction on the first face 12A, and the convex portion provided inside of the convex portion 30A constitutes the distinction element 28. The convex portion of the first recording layer 24 constituting the distinction element 28 is disposed in part of the circumferential direction.

Figure 16B:
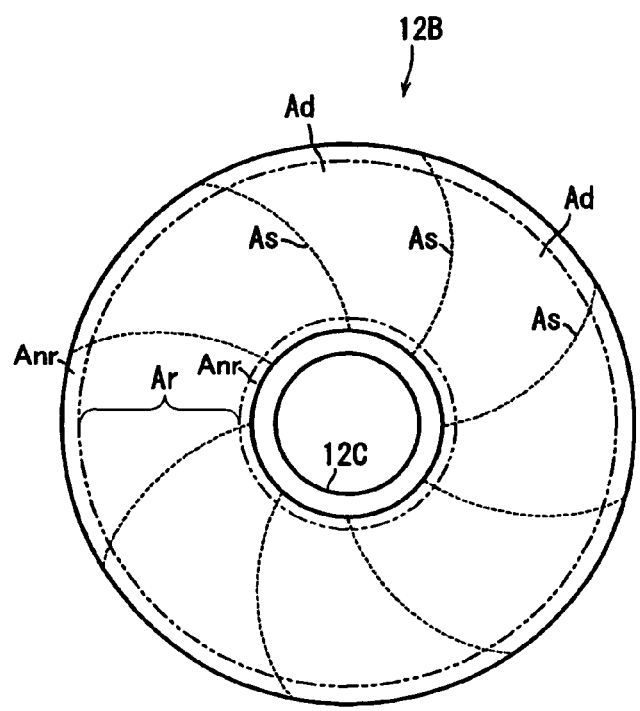
FIG. 16B is a plan view which schematically shows the structure of a second face of the magnetic recording medium.

On the other hand, as shown in FIG. 16B, any distinction element is not provided on the second face 12B. Since other components are the same as those of the first exemplary embodiment, the same reference numerals as in FIG. 1 to 4 are used, and the description thereof will be omitted.

As described above, in a case where the convex portion of the first recording layer 24 which constitutes the distinction element 28 is disposed in part of the circumferential direction and the distinction element 28 is provided only on one face, it is also possible to easily distinguish the first face 12A from the second face 12B.

Next, a method for forming the convex portion of the first recording layer 24 which constitutes the distinction element 28 in part of the circumferential direction will be described. In this method, the resin layer applying step (S204) and a resin layer processing step (S206) are different from those of the first exemplary embodiment. The other steps are the same as those of the first exemplary embodiment so that the description thereof will be omitted.

In the resin layer applying step (S204), the first resin layer 72 is applied from the inside of the position corresponding to the innermost convex portion 30A of the first recording layer 24 in the radial direction on the first face 12A of the first exemplary embodiment.

In the resin layer processing step (S206), the first resin layer 72 is processed into a concavo-convex pattern corresponding to the first concavo-convex pattern using the first stamper 80, in which a concave portion corresponding to the convex portion of the first recording layer 24 which constitutes the distinction element 28 and a convex portion corresponding to a concave portion surrounding it are formed. Thus, a convex portion corresponding to the convex portion of the first recording layer 24 which constitutes the distinction element 28 is formed in the first resin layer 72. By etching the first recording layer 24 on the basis of the first resin layer 72, it is possible to form the convex portion which constitutes the distinction element 28 in part of the first recording layer 24 in the circumferential direction. In the resin layer applying step (S204), the resin layer may be applied in such a manner that the radii of the inner peripheral edges of the first resin layer 72 and the second resin layer 74 are different as in the case of the first exemplary embodiment, or may be applied in such a manner that the radii of the inner peripheral edges are the same.

There is a case where the shape of the servo area As and the like of the first concavo-convex pattern is different from that of the second concavo-convex pattern. However, by forming the concave portion corresponding to the convex portion of the recording layer which constitutes the distinction element and the convex portion corresponding to the concave portion surrounding it in the stamper, it is possible to certainly make the appearance of a portion constituting the distinction element in each recording layer correspond with the appropriate concavo-convex pattern.

Note that in the first and second exemplary embodiments, though the distinction element is formed by applying the first resin layer 72 and the second resin layer 74 into forms having different inner peripheral edges without using the stamper, the first face 12A and the second face 12B of the workpiece to be processed 70 can be distinguished using the inner peripheral edges of the first resin layer 72 and the second resin layer 74 as the distinction element. Therefore, it is possible to make a portion constituting the distinction element and a corresponding concavo-convex pattern in each recording layer also in this case.

Next, a fourth exemplary embodiment of the present invention will be described.

Figure 17:
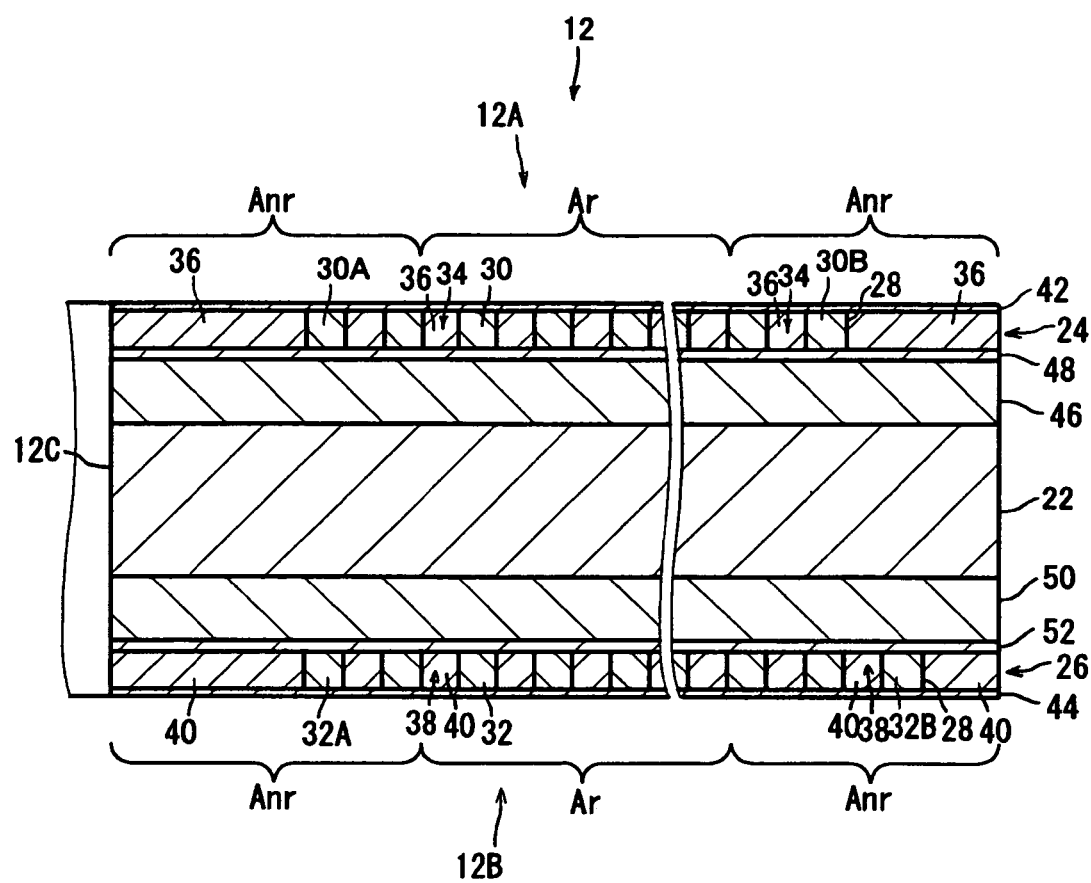
FIG. 17 is a cross-sectional view in a radial direction which schematically shows the structure of a magnetic recording medium according to a fourth exemplary embodiment of the present invention.
Figure 18A:
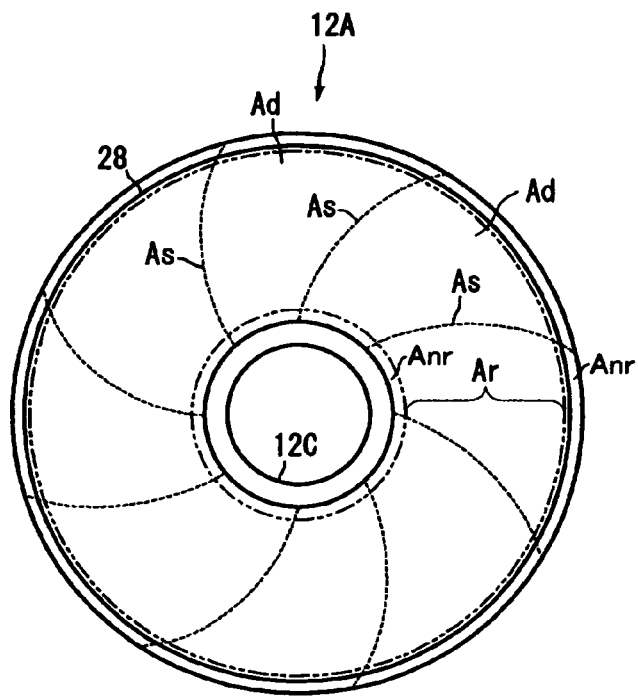
FIG. 18A is a plan view schematically showing the structure of a first face of the magnetic recording medium.
Figure 18B:
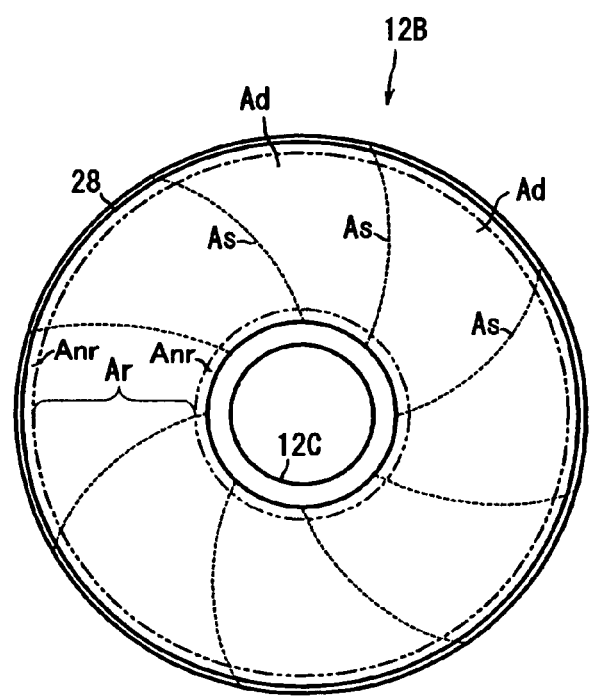
FIG. 18B is a plan view schematically showing the structure of a second face of the magnetic recording medium.

In the first exemplary embodiment, the radii of the inner peripheral edges of the innermost convex portions 30A and 32A of the first recording layer 24 and the second recording layer 26 in the radial direction are different from each other, and the inner peripheral edges of the innermost convex portions 30A and 32A of the first recording layer 24 and the second recording layer 26 in the radial direction having different radii constitute the distinction element 28. In the fourth exemplary embodiment, as shown in FIGS. 17, 18A, and 18B, the radii of outer peripheral edges of outermost convex portions 30B and 32B of the first recording layer 24 and the second recording layer 26 in the radial direction are different from each other, and the outer peripheral edges of the outermost convex portions 30B and 32B of the first recording layer 24 and the second recording layer 26 in the radial direction which have different radii constitute the distinction element 28. It is preferable that difference in the radii of the outer peripheral edges of the convex portions 30B and 32B be 100 μm to several mm. The first filler 36 is formed also on the outside of the outermost convex portion 30B of the first recording layer 24 in the radial direction, and the second filler 40 is formed also on the outside of the outermost convex portion 32B of the second recording layer 26 in the radial direction. The recording areas Ar are set except in the vicinity of the outer periphery and inner periphery of the magnetic recording medium 12, and the outer peripheral edges of the outermost convex portions 30B and 32B of the first recording layer 24 and the second recording layer 26 in the radial direction are disposed in the non-recording area Anr adjacent to the outer part of the recording area Ar in the radial direction. Since other components are the same as those of the first exemplary embodiment, the same reference numerals as in FIGS. 1 to 4 are used, and the description thereof will be omitted.

As described above, even in a case where the distinction element 28 is constituted of the outer peripheral edges of the outermost convex portions 30B and 32B of the first recording layer 24 and the second recording layer 26 in the radial direction which have different radii, it is possible to easily distinguish the first face 12A from the second face 12B.

Since the distinction element 28 is disposed over the entire circumference, it is possible to quickly and certainly check the distinction element 28.

As a method for forming the outermost convex portions 30B and 32B in the radial direction in which the radii of the outer peripheral edges are different in the first recording layer 24 and the second recording layer 26, as in the case of the third exemplary embodiment, there is a method using stampers in which concavo-convex patterns having concave portions and convex portions corresponding to the outermost convex portions 30B and 32B in the radial direction and concave portions outside thereof are formed.

In the fourth exemplary embodiment, in a protection layer deposition step (S214), the workpiece to be processed 70 may be held by its outer periphery with a jig or the like. There is a case where the first protection layer 42 and the second protection layer 44 are not deposited or where the thicknesses of the first protection layer 42 and the second protection layer 44 become thinner than those of the other portions in a portion of the workpiece to be processed 70 in which the workpiece to be processed 70 is held with the jig or the like. However, since the first filler 36 is formed also on the outside of the outermost convex portion 30B of the first recording layer 24 in the radial direction and the second filler 40 is formed also on the outside of the outermost convex portion 32B of the second recording layer 26 in the radial direction, even if there are portions where the first protection layer 42 and the second protection layer 44 are not deposited or where the thicknesses of the first protection layer 42 and the second protection layer 44 become thinner than the other portions, the portions are not in fact the first recording layer 24 and the second recording layer 26 but are parts of the first filler 36 and the second filler 40. Accordingly, the first recording layer 24 is certainly protected by the first protection layer 42, and the second recording layer 26 is certainly protected by the second protection layer 44.

Next, a fifth exemplary embodiment of the present invention will be described.

Figure 19A:
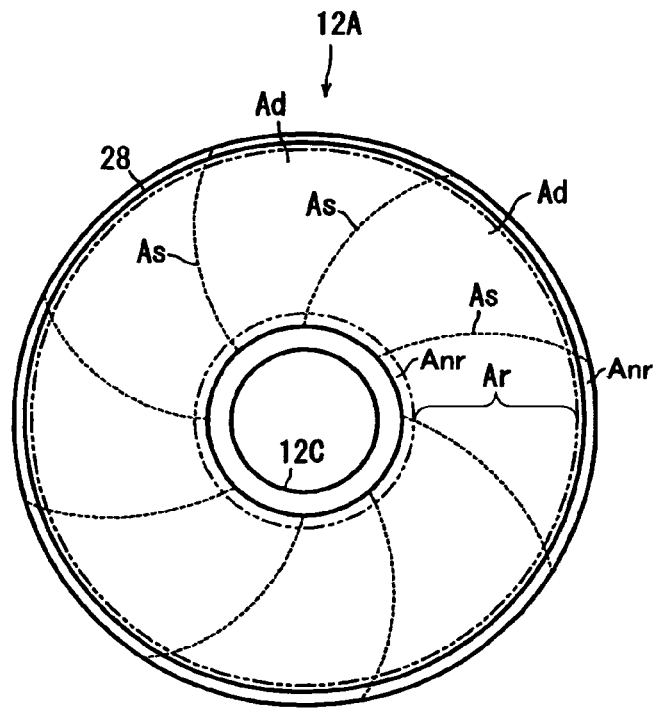
FIG. 19A is a plan view schematically showing the structure of a first face of a magnetic recording medium according to a fifth exemplary embodiment of the present invention.
Figure 19B:
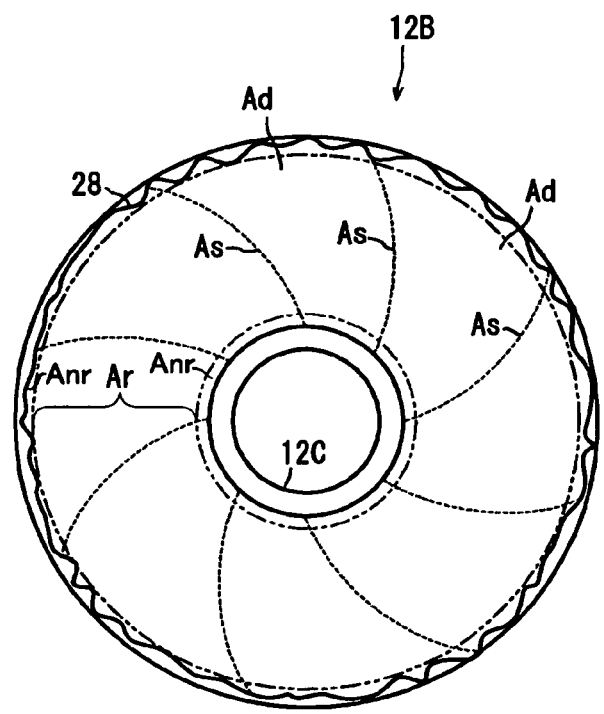
FIG. 19B is a plan view schematically showing the structure of a second face of the magnetic recording medium.

In the fourth exemplary embodiment, the radii of the outer peripheral edges of the outermost convex portions 30B and 32B of the first recording layer 24 and the second recording layer 26 in the radial direction are different from each other. However, in the fifth exemplary embodiment, as shown in FIGS. 19A and 19B, the shapes of the outer peripheral edges of the outermost convex portions of the first recording layer 24 and the second recording layer 26 in the radial direction are different from each other, and the outer peripheral edges of the outermost convex portions 30B and 32B of the first recording layer 24 and the second recording layer 26 in the radial direction which have different shapes constitute the distinction element 28.

To be more specific, the outer peripheral edge of the outermost convex portion of the first recording layer 24 in the radial direction has such a shape that its radius is substantially constant. On the other hand, the outer peripheral edge of the outermost convex portion of the second recording layer 26 in the radial direction has such a shape that its radius varies wavily in accordance with a position in the circumferential direction. Since other components are the same as those of the fourth exemplary embodiment, so that the same reference numerals as in FIGS. 17, 18A, 18B, and the like are used, and the description thereof will be omitted.

It is possible to easily distinguish the first face 12A from the second face 12B even in a case where the distinction element 28 is constituted of the outer peripheral edges, having different shapes, of the outermost convex portions 30B and 32B of the first recording layer 24 and the second recording layer 26 in the radial direction.

Since the distinction element 28 is disposed over the entire circumference, the distinction element 28 is quickly and certainly checked.

As a method for forming the outermost convex portions 30B and 32B of the first recording layer 24 and the second recording layer 26 in the radial direction in which the shapes of the outer peripheral edges are different from each other, as in the case of the third exemplary embodiment, there is a method using stampers in which concavo-convex patterns having concave portions and convex portions corresponding to the outermost convex portions 30B and 32B in the radial direction and concave portions outside thereof are formed.

Next, a sixth exemplary embodiment of the present invention will be described.

Figure 20A:
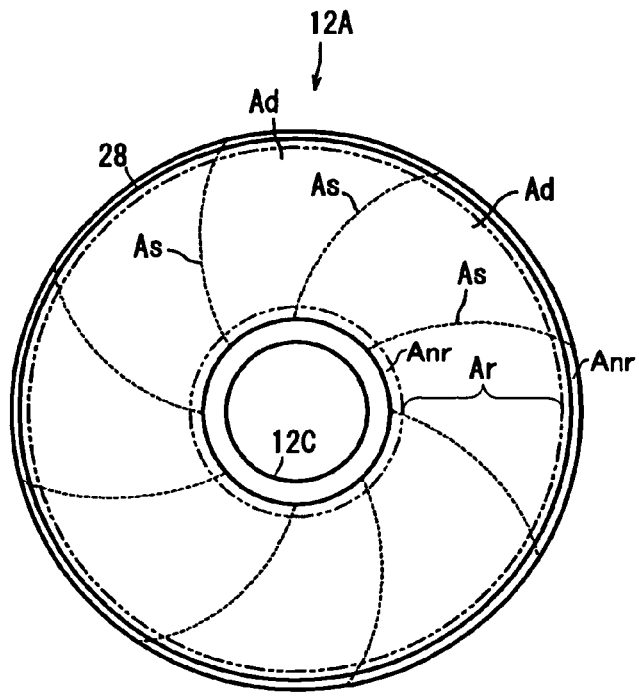
FIG. 20A is a plan view schematically showing the structure of a first face of a magnetic recording medium according to a sixth exemplary embodiment of the present invention.
Figure 20B:
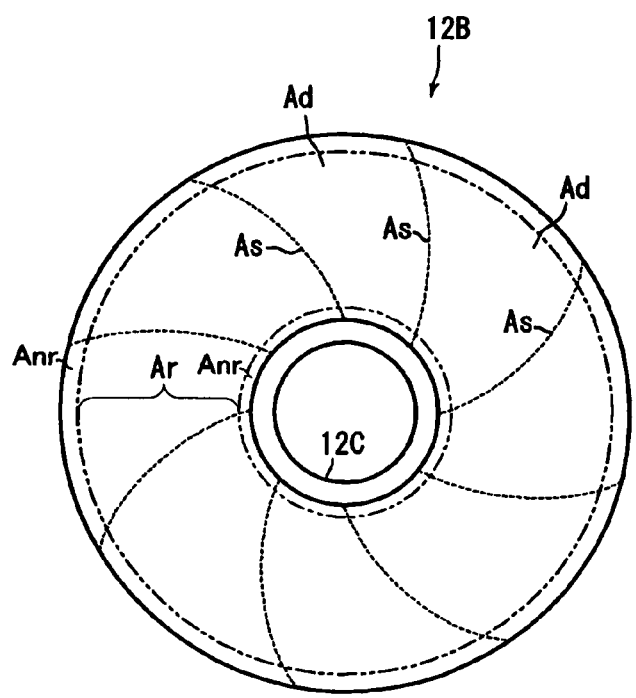
FIG. 20B is a plan view schematically showing the structure of a second face of the magnetic recording medium.

In the fourth exemplary embodiment, the radii of the outer peripheral edges of the outermost convex portions 30B and 32B of the first recording layer 24 and the second recording layer 26 in the radial direction are different from each other, and the first filler 36 is formed also on the outside of the outermost convex portion of the first recording layer 24 in the radial direction and the second filler 40 is formed also on the outside of the outermost convex portion of the second recording layer 26 in the radial direction. However, in the sixth exemplary embodiment, as shown in FIG. 20B, the outer peripheral edge of the outermost convex portion 32B of the second recording layer 26 in the radial direction coincides with the outer periphery of the magnetic recording medium 12, and the second filler 40 is not formed on the outside of the outermost convex portion 32B of the second recording layer 26 in the radial direction. The outer peripheral edge of the outermost convex portion 30B of the first recording layer 24 in the radial direction, on the other hand, is smaller than the outer periphery of the magnetic recording medium 12 as in the case of the fourth exemplary embodiment, and, as shown in FIG. 20A, the first filler 36 is formed also on the outside of the outermost convex portion of the first recording layer 24 in the radial direction. Only the outer peripheral edge of the outermost convex portion 30B of the first recording layer 24 of the first face 12A in the radial direction constitutes the distinction element 28. Since other components are the same as those of the fourth exemplary embodiment, the same reference numerals as in FIGS. 17, 18A, 18B, and the like are used, and the description thereof will be omitted.

As described above, even in a case where the distinction element 28 is disposed in only one face, it is possible to easily distinguish the first face 12A from the second face 12B.

Also, the distinction element 28 is disposed over the entire circumference, it is possible to quickly and certainly check the distinction element 28.

The appearance of the distinction element is not limited to those described in the first to sixth exemplary embodiments. For example, in the first and second exemplary embodiment, the distinction element 28 is disposed in the non-recording area Anr adjacent to the inner part of the recording area Ar in the radial direction on both of the first and second faces, but the distinction element 28 may be disposed in the non-recording area Anr adjacent to the inner part of the recording area Ar in the radial direction on only one of the first and second faces.

For example, in the first and second exemplary embodiments, the inner peripheral edge of the innermost convex portion of the first recording layer in the radial direction may coincide with the inner peripheral edge of the magnetic recording medium. In the third exemplary embodiment, the convex portion of the first recording layer 24 to constitute the distinction element 28 which is disposed in only part of the circumferential direction approximately has the shape of a circle as shown in FIG. 16A, but a distinction element in the shape of a polygon such as a triangle and a rectangle, a star, or the like may be disposed instead.

In the first and second exemplary embodiments, by applying the first resin layer and the second resin layer by spin coating in such a manner that the inner peripheral edges have different appearances, the inner peripheral edges of the innermost convex portions 30A and 32A of the first recording layer 24 and the second recording layer 26 in the radial direction are processed into different appearances, and the inner peripheral edges of the convex portions 30A and 32A form the distinction element 28. However, as in the cases of the fourth to sixth exemplary embodiments, when a concavo-convex pattern corresponding to the first concavo-convex pattern is transferred to the first resin layer by the first stamper and a concavo-convex pattern corresponding to the second concavo-convex pattern is transferred to the second resin layer by the second stamper, the first resin layer and the second resin layer may be processed in such a manner that the appearances of the inner peripheral edges of the radially innermost convex portions of the concavo-convex patterns transferred to the first resin layer and the second resin layer differ from each other. Accordingly, the inner peripheral edges of the innermost convex portions 30A and 32A of the first recording layer 24 and the second recording layer 26 in the radial direction are processed into different appearances, so that the inner peripheral edges of the convex portions 30A and 32A constitute the distinction element 28.

In the first exemplary embodiment, the first resin layer 72 is formed over the first continuous recording layer 56 through the first main mask layer 62 and the second sub mask layer 64 and the second resin layer 74 is formed over the second continuous recording layer 58 through the second main mask layer 66 and the second sub mask layer 68. Furthermore, the first continuous recording layer 56 and the second continuous recording layer 58 are etched on the basis of the first resin layer 72 and the second resin layer 74 in three processes, but materials, the number of deposition and thickness of the resin layers and the mask layers, the type of dry etching, and the like are not particularly limited as long as the recording layer is processed with precision. For example, the first resin layer 72 may be directly deposited on the first continuous recording layer 56 and the second resin layer 74 may be directly deposited on the second continuous recording layer 58 too, and the first continuous recording layer 56 and the second continuous recording layer 58 may be etched on the basis of the first resin layer 72 and the second resin layer 74 in one process.

In the foregoing first to sixth exemplary embodiments, the energy-curable resin is used as a material for the first resin layer 72 and the second resin layer 74, and the first resin layer 72 and the second resin layer 74 is cured by the irradiation of the energy rays in the resin layer processing step (S206). However, a thermosetting resin or a thermoplastic resin may be used as materials for the first resin layer 72 and the second resin layer 74, and the first resin layer 72 and the second resin layer 74 may be cured by heating or cooling in the resin layer processing step (S206).

In the foregoing first to sixth exemplary embodiments, the first recording layer 24 and the second recording layer 26 are completely divided, but the first continuous recording layer 56 and the second continuous recording layer 58 may be partway processed in the thickness direction and a recording layer in a concavo-convex pattern which continues below concave portions may be formed.

In the foregoing first to sixth exemplary embodiments, the first continuous recording layer 56 and the second continuous recording layer 58 are processed into the concavo-convex patterns by dry etching to form the first recording layer 24 in the first concavo-convex pattern and the second recording layer 26 in the second concavo-convex pattern, and the first filler 36 and the second filler 40 are deposited thereover to fill the concave portions 34 and 38 with the first filler 36 and the second filler 40, and then excess parts of the first filler 36 and second filler 40 are removed by dry etching for flattening. However, a filler of a continuous film may be processed into a concavo-convex pattern by dry etching, and a recording layer may be deposited over the filler in the concavo-convex pattern to fill concave portions with the recording layer. Then, excess parts of the recording layer may be removed by dry etching for flattening in order to manufacture a magnetic recording medium which includes the recording layer formed in the concavo-convex pattern and the filler filling the concave portions of the recording layer on both sides of a substrate.

The surfaces of the substrate may be processed into concavo-convex patterns and recording layers and the like may be deposited following the concavo-convex patterns to form the recording layers in the concavo-convex patterns. In this case, the recording layer becomes a continuous film the top face and bottom face of which are in the concavo-convex pattern.

In the first to sixth exemplary embodiments, the first protection layer 42 and the lubricating layer are formed over the first recording layer 24 and the second protection layer 44 and the lubricating layer are formed over the second recording layer 26, but one or both of the protection layer and the lubricating layer may be omitted in accordance with required performance.

In the first to sixth exemplary embodiments, the first soft magnetic layer 46 and the first seed layer 48 are formed between the first recording layer 24 and the substrate 22, and the second soft magnetic layer 50 and the second seed layer 52 are formed between the second recording layer 26 and the substrate 22. The structure between the first recording layer 24 and the substrate 22 and between the second recording layer 26 and the substrate 22 may be appropriately changeable in accordance with the kind of magnetic recording medium. For example, an antiferromagnetic layer or an under layer may be formed between the first soft magnetic layer 46 and the substrate 22 and between the second soft magnetic layer 50 and the substrate 22. Furthermore, one of the first soft magnetic layer 46, the second soft magnetic layer 50, the first seed layer 48, and the second seed layer 52 may be omitted. The first recording layer 24 and the second recording layer 26 may be directly formed on the substrate 22.

In the first to sixth exemplary embodiments, the magnetic recording medium 12 is a perpendicular recording magnetic disk, but various exemplary embodiments of the present invention are applicable to a longitudinal recording magnetic disk.

In the first to sixth exemplary embodiments, the magnetic recording medium 12 has the center hole 12C, but various exemplary embodiments of the present invention are applicable to a magnetic recording medium without a center hole.

In the first to sixth exemplary embodiments, the first recording layer 24 and the second recording layer 26 are formed in the shape of concentric tracks at minute intervals in the radial direction in the data areas Ad of the recording areas Ar, and are formed in the servo patterns in the servo areas As of the recording areas Ar. However, the first recording layer 24 and the second recording layer 26 may be formed in concavo-convex patterns which are the same as the shape of tracks and the servo patterns also in the non-recording areas Anr adjacent to the inner part and/or the outer part of the recording area Ar in the radial direction. Note that in the present application, the recording area Ar means an area in the first recording layer 24 and in the second recording layer 26, in which a portion actually used for recording data and servo information is disposed. The other portion formed in the concavo-convex pattern in the non-recording area Anr in the first recording layer 24 and in the second recording layer 26 is not used for recording data and servo information.

In the first to sixth exemplary embodiments, the magnetic recording medium 12 is a discrete track medium, but various exemplary embodiments of the present invention are applicable to, for example, a patterned medium and a magnetic disk having a helical track. Various exemplary embodiments of the present invention is also applicable to a magneto-optical disk such as an MO and a heat-assisted magnetic disk using both of magnetism and heat.

What is claimed is:

1. A magnetic recording medium comprising:
    a substrate;
    a first recording layer formed in a first concavo-convex pattern on a side of a first face, which is one side of the substrate;
    a second recording layer formed in a second concavo-convex pattern on a side of a second face, which is another side of the substrate opposite to the side of the first face; and
    a distinction element for distinguishing the first face from the second face, wherein
    at least part of the distinction element is disposed in a non-recording area adjacent to at least one of an inner part and an outer part of a recording area in a radial direction.

2. The magnetic recording medium according to claim 1, wherein
    the distinction element is disposed over an entire circumference of the medium.

3. The magnetic recording medium according to claim 2, wherein:
    an innermost convex portion of the first recording layer and an innermost convex portion of the second recording layer in a radial direction each have a shape along a circle; and
    appearances of inner peripheral edges of the innermost convex portions are different from each other and the appearances of the inner peripheral edges constitute the distinction element.

4. The magnetic recording medium according to claim 3, wherein
    a radius of the inner peripheral edge of the innermost convex portion of the first recording layer in the radial direction is different from that of the inner peripheral edge of the innermost convex portion of the second recording layer in the radial direction.

5. The magnetic recording medium according to claim 3, wherein
    a shape of the inner peripheral edge of the innermost convex portion of the first recording layer in the radial direction is different from that of the inner peripheral edge of the innermost convex portion of the second recording layer in the radial direction.

6. The magnetic recording medium according to claim 5, wherein
    one of the inner peripheral edges of the innermost convex portions of the first recording layer and the second recording layer in the radial direction has a shape with a substantially fixed radius, and another inner peripheral edge has a shape with a radius varying wavily in accordance with a position in a circumferential direction.

7. The magnetic recording medium according to claim 2, wherein:
    an outermost convex portion of the first recording layer and an outermost convex portion of the second recording layer in a radial direction each have a shape along a circle; and
    appearances of outer peripheral edges of the outermost convex portions are different from each other and the appearances of the outer peripheral edges constitute the distinction element.

8. The magnetic recording medium according to claim 7, wherein
    a radius of the outer peripheral edge of the outermost convex portion of the first recording layer in the radial direction is different from that of the outer peripheral edge of the outermost convex portion of the second recording layer in the radial direction.

9. The magnetic recording medium according to claim 7, wherein
    a shape of the outer peripheral edge of the outermost convex portion of the first recording layer in the radial direction is different from that of the outer peripheral edge of the outermost convex portion of the second recording layer in the radial direction.

10. The magnetic recording medium according to claim 9, wherein
    one of the outer peripheral edges of the outermost convex portions of the first recording layer and the second recording layer in the radial direction has a shape with a substantially fixed radius, and another outer peripheral edge has a shape with a radius varying wavily in accordance with a position in a circumferential direction.

11. The magnetic recording medium according to claim 3 further comprising:
    a first filler for filling a concave portion of the first concavo-convex pattern;
    a second filler for filling a concave portion of the second concavo-convex pattern;
    a first protection layer for covering the first recording layer and the first filler; and
    a second protection layer for covering the second recording layer and the second filler, wherein
    the first filler is formed also on at least one of an inside of the innermost convex portion in the radial direction and an outside of an outermost convex portion in the radial direction of the first recording layer, and the second filler is formed also on at least one of an inside of the innermost convex portion in the radial direction and an outside of an outermost convex portion in the radial direction of the second recording layer.

12. The magnetic recording medium according to claim 7 further comprising:
    a first filler for filling a concave portion of the first concavo-convex pattern;
    a second filler for filling a concave portion of the second concavo-convex pattern;
    a first protection layer for covering the first recording layer and the first filler; and a second protection layer for covering the second recording layer and the second filler, wherein the first filler is formed also on at least one of an inside of an innermost convex portion in the radial direction and an outside of the outermost convex portion in the radial direction of the first recording layer, and the second filler is formed also on at least one of an inside of an innermost convex portion in the radial direction and an outside of the outermost convex portion in the radial direction of the second recording layer.

13. A magnetic recording and reproducing apparatus comprising:

the magnetic recording medium according to claim 1;

a first magnetic head for recording and reproducing data on and from the first face of the magnetic recording medium; and a second magnetic head for recording and reproducing data on and from the second face of the magnetic recording medium.

14. A method for checking a magnetic recording medium comprising the steps of:

a preparing step for preparing a body to be checked having a substrate, a first recording layer formed in a first concavo-convex pattern on a side of a first face, which is one side of the substrate, a second recording layer formed in a second concavo-convex pattern on a side of a second face, which is another side of the substrate opposite to the side of the first face, and a distinction element for distinguishing the first face from the second face, at least part of the distinction element being disposed in a non-recording area adjacent to at least one of an inner part and an outer part of a recording area in a radial direction; and a distinguishing step for distinguishing the first face from the second face of the body to be checked on the basis of the distinction element.

* * * * *